United States Patent
Clark, II et al.

(10) Patent No.: US 9,103,088 B2
(45) Date of Patent: Aug. 11, 2015

(54) INTERNAL JACKET LEG CUTTER AND METHOD

(75) Inventors: Galen R. Clark, II, Lafayette, LA (US); Michael Todd Martin, Youngsville, LA (US); Gary L. Siems, Lafayette, LA (US)

(73) Assignee: TETRA Technologies, Inc., The Woodlands, TX (US)

( * ) Notice: Subject to any disclaimer, the term of this patent is extended or adjusted under 35 U.S.C. 154(b) by 765 days.

(21) Appl. No.: 13/153,562

(22) Filed: Jun. 6, 2011

(65) Prior Publication Data
US 2011/0290091 A1    Dec. 1, 2011

Related U.S. Application Data

(63) Continuation of application No. PCT/US2010/020856, filed on Jan. 13, 2010.

(60) Provisional application No. 61/144,268, filed on Jan. 13, 2009.

(51) Int. Cl.
*E02D 9/04* (2006.01)
*B26D 3/16* (2006.01)
*B23D 21/14* (2006.01)
*E02D 9/00* (2006.01)

(52) U.S. Cl.
CPC ........ *E02D 9/04* (2013.01); *E02D 9/005* (2013.01); *Y10T 83/0596* (2015.04); *Y10T 83/384* (2015.04); *Y10T 83/391* (2015.04)

(58) Field of Classification Search
CPC ...... E02D 9/005; E02D 9/04; B23D 57/0084; B23D 53/003; B23D 21/00; B23D 45/128; Y10T 403/7069; Y10T 83/0596; Y10T 83/384; Y10T 83/391

USPC .......... 166/297, 361, 55, 55.6, 55.7; 405/197, 405/208, 224, 227, 228, 232, 235

See application file for complete search history.

(56) References Cited

U.S. PATENT DOCUMENTS

| | | | | | |
|---|---|---|---|---|---|
| 2,728,138 | A | * | 12/1955 | Guild | 30/92 |
| 2,915,819 | A | * | 12/1959 | O'Day et al. | 30/103 |
| 3,052,024 | A | * | 9/1962 | Courtney | 30/105 |
| 3,293,963 | A | * | 12/1966 | Carroll et al. | 83/54 |
| 3,727,599 | A | * | 4/1973 | Sugiki et al. | 125/23.01 |
| 4,389,765 | A | * | 6/1983 | Thompson, Jr. | 29/426.5 |
| 4,844,660 | A | * | 7/1989 | Ortemond | 405/224 |
| 5,006,687 | A | * | 4/1991 | Fujita et al. | 219/121.59 |
| 6,626,074 | B1 | * | 9/2003 | Wheeler | 82/113 |

FOREIGN PATENT DOCUMENTS

| | | | | | |
|---|---|---|---|---|---|
| GB | | 2129350 A | * | 5/1984 | B23C 1/20 |
| WO | WO 9201841 A1 | | * | 2/1992 | E02D 9/00 |

* cited by examiner

*Primary Examiner* — James G Sayre
(74) *Attorney, Agent, or Firm* — Brett A. North; Garvey, Smith, Nehrbass & North, LLC.

(57) ABSTRACT

An internal caisson/jacket leg cutter and method provides a frame having upper and lower end portions. The upper end portion has rigging that enables the frame to be lifted. Extensible arms are movably supported upon the frame. The arms extend and retract along generally radially extending lines. Extension of the arms enables them to contact the inside surface of a caisson/jacket leg and thus center and anchor the frame within the caisson/jacket leg interior. A cutting mechanism at the lower end portion of the frame includes one or more rotary cutters or milling devices that cut the caisson/jacket leg wall as these cutters traverse an arc shaped path, tracking the caisson/jacket leg wall.

25 Claims, 20 Drawing Sheets

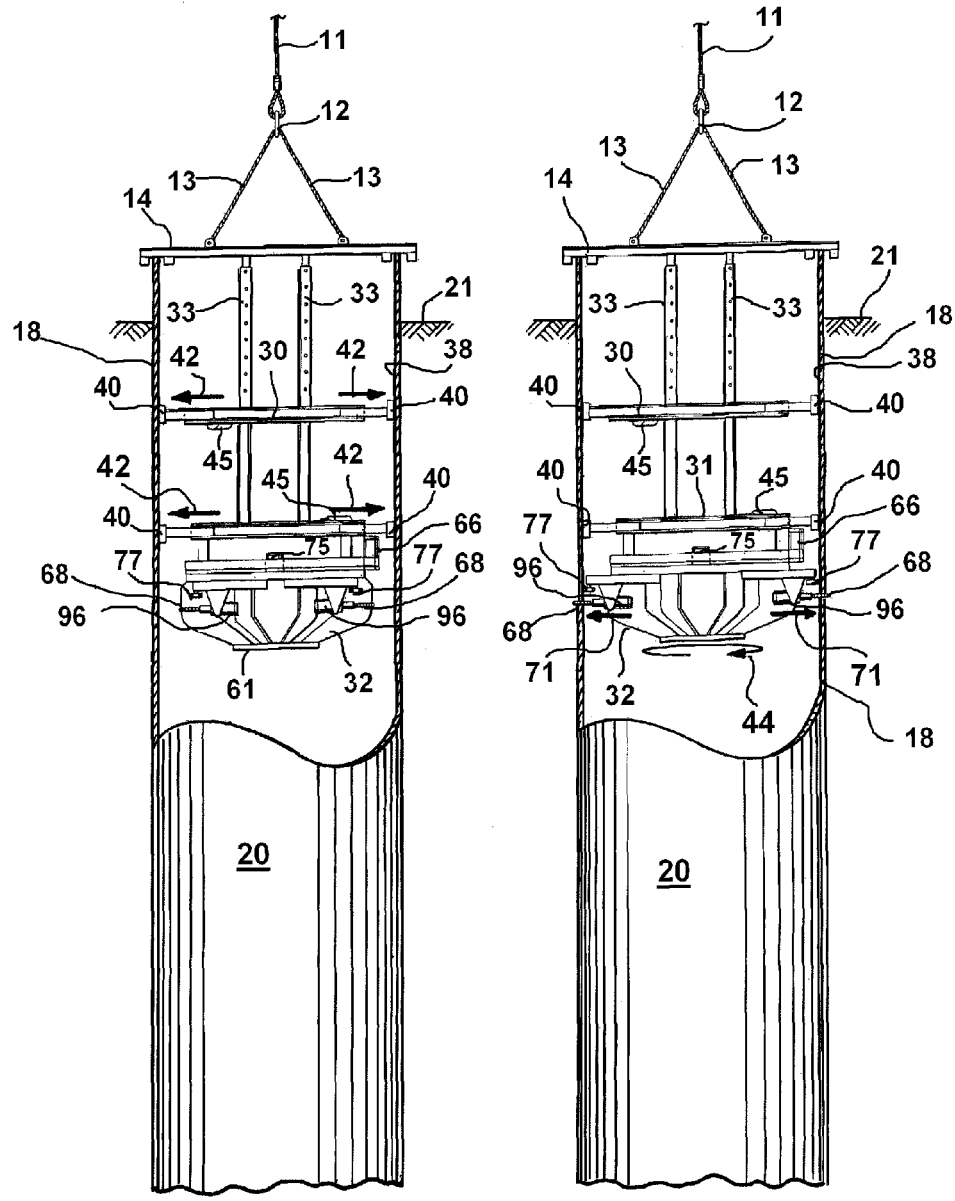

INTERNAL JACKET LEG CUTTER AND METHOD

CROSS-REFERENCE TO RELATED APPLICATIONS

This is a continuation of International Patent Application Serial No. PCT/US2010/020856, filed Jan. 13, 2010, which application was a non-provisional of U.S. Provisional Patent Application Ser. No. 61/144,268, filed Jan. 13, 2009.

Each of these applications are incorporated herein by reference. Priority of each of these applications is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Offshore marine platforms are often constructed for the purpose of producing oil and/or gas from a formation below a seabed. These offshore marine platforms typically employ an undersea structure referred to as a "jacket". Patents have issued that are directed to platform jackets. One example is U.S. Pat. No. 4,721,416 entitled "Submersible Offshore Drilling and Production Platform Jacket" issued to Garcia. U.S. Pat. No. 4,721,416 is incorporated herein by reference.

Patents have issued that relate to the disposal of jackets. An example is U.S. Pat. No. 6,354,765 entitled "Method of Transporting and Disposing of an Offshore Platform Jacket" issued to Jones. U.S. Pat. No. 6,354,765 is incorporated herein by reference.

After the useful life of a marine platform is over, the platform and the jacket must be removed so that they are not a hazard to navigation. Because portions of a marine jacket can extend into the seabed (for example, see FIG. 1 of U.S. Pat. No. 4,721,416, part of the jacket (sometimes referred to as a jacket leg) must be removed below the mud line. It is important to remove jacket legs below the mud line because they are a hazard to navigation. They are also a hazard to fishing boats that employ nets, such as shrimp boats.

A caisson can be one of several columns made of steel or concrete that serve as the foundation for a rigid offshore platform rig, such as the concrete gravity platform rig. A caisson can also be a steel or concrete chamber that surrounds equipment below the waterline of a submersible rig, which can protect such equipment from damage.

Prior art methods of removal of caisson/jacket legs below the mud line have included digging a trench around the exterior of the caisson/jacket leg and, after such trench has been dug, cutting the caisson/jacket leg. This prior method has the disadvantage of requiring the extra step of digging the trench, dealing with the materials removed when digging the trench, along with maintaining the stability of such trench during cutting of the caisson/jacket leg. If stability of the trench is not maintained, the trench can collapse during cutting operations risking bodily injury along with damage to equipment.

BRIEF SUMMARY

One embodiment relates to a method and apparatus for removing tubular members that are embedded in a seabed such as offshore marine caisson/jacket legs that extend below the seabed mud line. More particularly, one embodiment relates to an improved internal caisson/jacket leg cutter apparatus and method wherein rotary cutters are supported by a frame that engages the interior caisson/jacket leg wall, a part of the frame providing a bearing that rotates as rotary cutters form a cut in the wall of the caisson/jacket leg. In one embodiment, two rotary cutters are circumferentially spaced apart so that when the frame rotates about one hundred eighty (180) degrees, a complete three hundred sixty (360) degree cut is made.

In one embodiment is provided an improved method and apparatus for removing tubular members such as caisson/jacket legs from a seabed. In one embodiment is provided an internal caisson/jacket leg cutter that is configured to be lowered into the interior of a caisson/jacket leg.

In one embodiment is provided extendable/retractable arms of a frame which can extend to the inner surface of the caisson/jacket leg holding/stabilizing the frame relative to the caisson/jacket leg.

In one embodiment is provided a cutting mechanism employing one or more milling devices that are rotary cutters. These rotary cutters cut the caisson/jacket leg wall as the cutter travels along horizontal plane perpendicular to the central axis of the cutter.

In one embodiment the cutter can travel along a curved or arc shaped path when making a cut.

In one embodiment, a pair of cutters are provided, spaced about one hundred eighty (180) degrees apart.

In one embodiment the operator of the internal caisson/jacket leg cutter can be above water and the cutting mechanism be below water. In one embodiment the operator can use the resistance on the cutters to determine when to rotationally advance the cutters. In one embodiment the resistance can be relatively determined based on the back pressure (e.g., hydraulic back pressure) to the rotational feed motor and/or back pressure to the driving motors for the cutters.

In one embodiment the pressures are monitored and system is programmed to monitor the pressure to maintain a relatively constant feed rate.

In one embodiment the operator of the internal caisson/jacket leg cutter can rotationally advance the cutters until a specified resistance is seen. At this point the operator can decrease the rotational feed rate until the resistance on the cutters decreases. Upon decrease of the resistance to the cutters the operator can again increase the feed rate of the cutting bit. This feed rate adjusting process can be repeated until the cut is completed.

In one embodiment the internal caisson/jacket leg cutter can include a mounting bracket for one or more underwater lights along with one or more cameras for visual monitoring at the surface. In one embodiment cutting operations can be visually recorded on the surface using a video monitoring system such as a video camera. In one embodiment a fiber optic cable can be used to transmit the video signal from the camera to the surface.

In one embodiment high frequency sonar and/or infra red imagery can be used to scan and/or view the cut as it progresses.

One embodiment includes an internal caisson/jacket leg cutter comprising: a) a frame having upper and lower end portions; b) the upper end having rigging that enables the frame to be lifted; c) extensible arms movably supported upon the frame and that extend and retract along generally radial lines, extension of the arms enabling the arms to center the frame inside a caisson/jacket leg; d) an extensible cylinder on the frame that simultaneously extends the arms during centralization of the frame within a caisson/jacket leg; and e) a cutting mechanism that includes circumferentially spaced apart cutters that cut the caisson/jacket leg wall as each cutter travels along an arc shaped path traversing the caisson/jacket leg wall.

In one embodiment, there can be one cutter, a pair of the cutters, or three or more cutters. In one embodiment, each cutter is a rotary mill. In one embodiment, there are upper and lower pluralities of arms. In one embodiment, a motor drive rotates each cutter along the arc shaped path. In one embodiment, each cutter is movable between extended and retracted positions. In one embodiment, a rack and pinion drive moves the cutters between extended and retracted positions. In one embodiment, the frame includes a top that is configured to rest upon the top of a caisson/jacket leg to be cut.

In one embodiment, the extensible arms are mounted in between a pair of plates. In one embodiment, one of the plates is a static plate and the other plate is a rotating plate. In one embodiment, the extensible cylinder rotates one plate relative to the other plate. In one embodiment, there are a plurality of curved slots on the static plate and pins on the extensible arms that travel in the curved slots. In one embodiment, there are a plurality of curved slots on the static plate, a plurality of straight slots on the rotating plate and pins on the extensible arms that travel in both the curved slots and the straight slots. In one embodiment, the slots have inner and outer end portions, the pin positioned at the inner end portions of the slots when the arms are in the retracted position. In one embodiment, the pin of each arm is positioned at the outer end portion of the slots when the arms are in the extended position.

One embodiment includes an internal caisson/jacket leg cutter comprising: a) a frame having upper and lower end portions; b) the frame upper end portion having rigging that enables the frame to be lifted; c) upper and lower spacing assemblies, each spacing assembly comprising a plurality of circumferentially space apart, radially extending arms that are movably supported upon the frame and that each extend and retract along generally radial lines, the spacing assemblies spacing the frame inwardly of a caisson/jacket leg inner surface at upper and lower spaced apart positions; d) each spacing assembly having static and rotating plates and an operator that simultaneously extends the arms during a spacing of the frame within a caisson/jacket leg by rotating the moving plate relative to the static plate; and e) a cutting mechanism that includes one or more rotary cutters that cut the caisson/jacket leg wall as each cutter travels along an arc shaped path traversing the caisson/jacket leg wall.

In one embodiment, each cutter is a rotary mill. In one embodiment, each cutter is movable between extended and retracted positions. In one embodiment, the extensible arms are mounted in between a pair of plates, wherein one of the plates is a static plate and the other plate is a rotating plate. In one embodiment, the cutters are hydraulically powered. In one embodiment, a rotary bearing connects the cutting mechanism to the lower spacing assembly. In one embodiment, the cutter includes static and rotating portions. In one embodiment, there are a pair of cutters. In one embodiment, the cutters are about 180 degrees apart. In one embodiment, the cutters are circumferentially spaced. In one embodiment, the cutters are extendable from a retracted position to an extended position. In one embodiment, each spacing assembly is vertically adjustable relative to the frame. In one embodiment, the frame includes multiple vertically extending members. In one embodiment, the spacing assemblies include an extensible cylinder.

In one embodiment, each spacing assembly includes a rotating plate with curved slots and a static plate with slots, each arm having a pin that travels in slots of each plate. In one embodiment, the arms are in between the static and rotating plates.

BRIEF DESCRIPTION OF THE SEVERAL VIEWS OF THE DRAWINGS

For a further understanding of the nature, objects, and advantages of the present invention, reference should be made to the following detailed description, read in conjunction with the following drawings, wherein like reference numerals denote like elements and wherein:

FIG. 8 schematically illustrates the step of extending the upper and lower sets of stabilizing arms.

FIG. 9 schematically illustrates the step of extending the double milling cutters and rotating the positioning ring.

DETAILED DESCRIPTION

Figure 1:
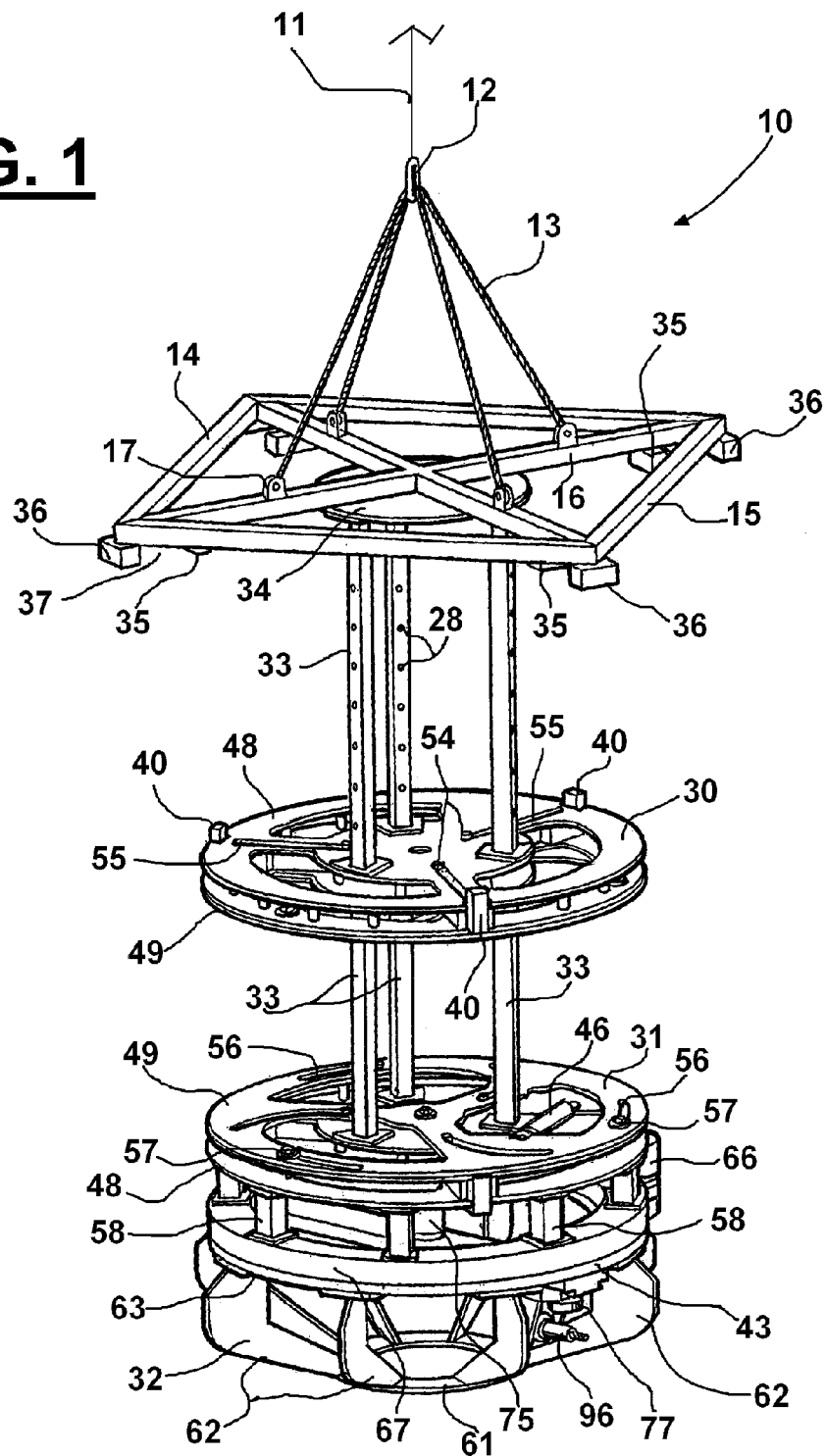
FIG. 1 is an overall perspective view of one embodiment of an internal cutter.
Figure 2:
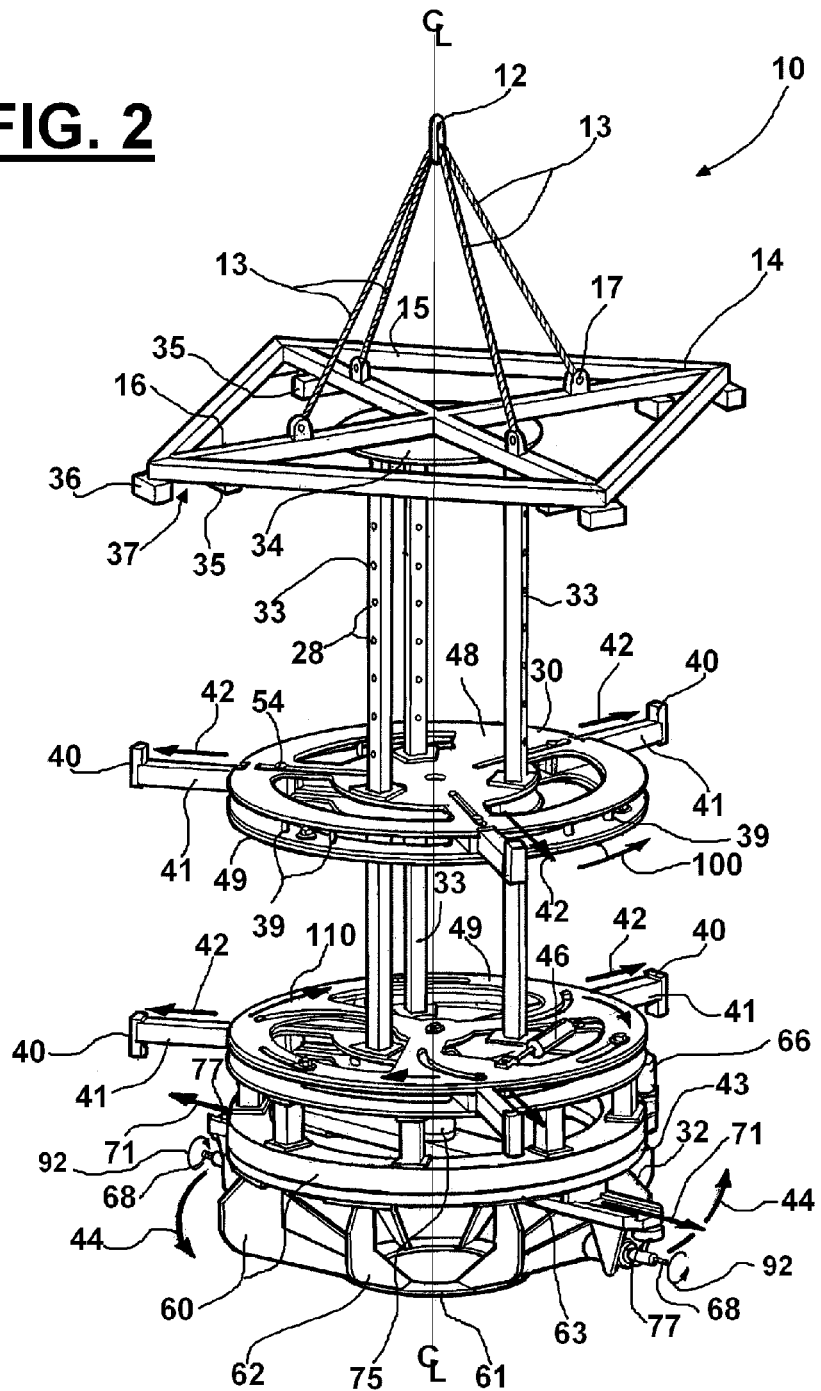
FIG. 2 shows the cutter of FIG. 1 schematically indicating extension of the upper and lower sets of stabilizing/anchoring arms; rotation of the positioning ring in a horizontal plane; axial rotation of the double milling bits; extension of the double milling cutters; and rotation of the milling bits in the horizontal plane perpendicular to the centerline axis CL of the internal cutting tool.

FIGS. 1-2 show the preferred embodiment of the apparatus of the present invention, designated generally by the numeral 10. FIG. 1 is an overall perspective view of one embodiment of an internal caisson/jacket leg cutter apparatus 10. FIG. 2 shows the cutter 10 schematically indicating extension of the upper and lower sets of stabilizing arms (schematically indicated by arrows 42); rotation of the positioning ring 32 in a horizontal plane also rotating the double milling cutters 68 (schematically indicated by arrows 44); extension of the double milling cutters 68 (schematically indicated by arrows 71); and rotation of the milling bits in the double milling cutters (schematically indicated by arrows 92).

Figures 6, 7:
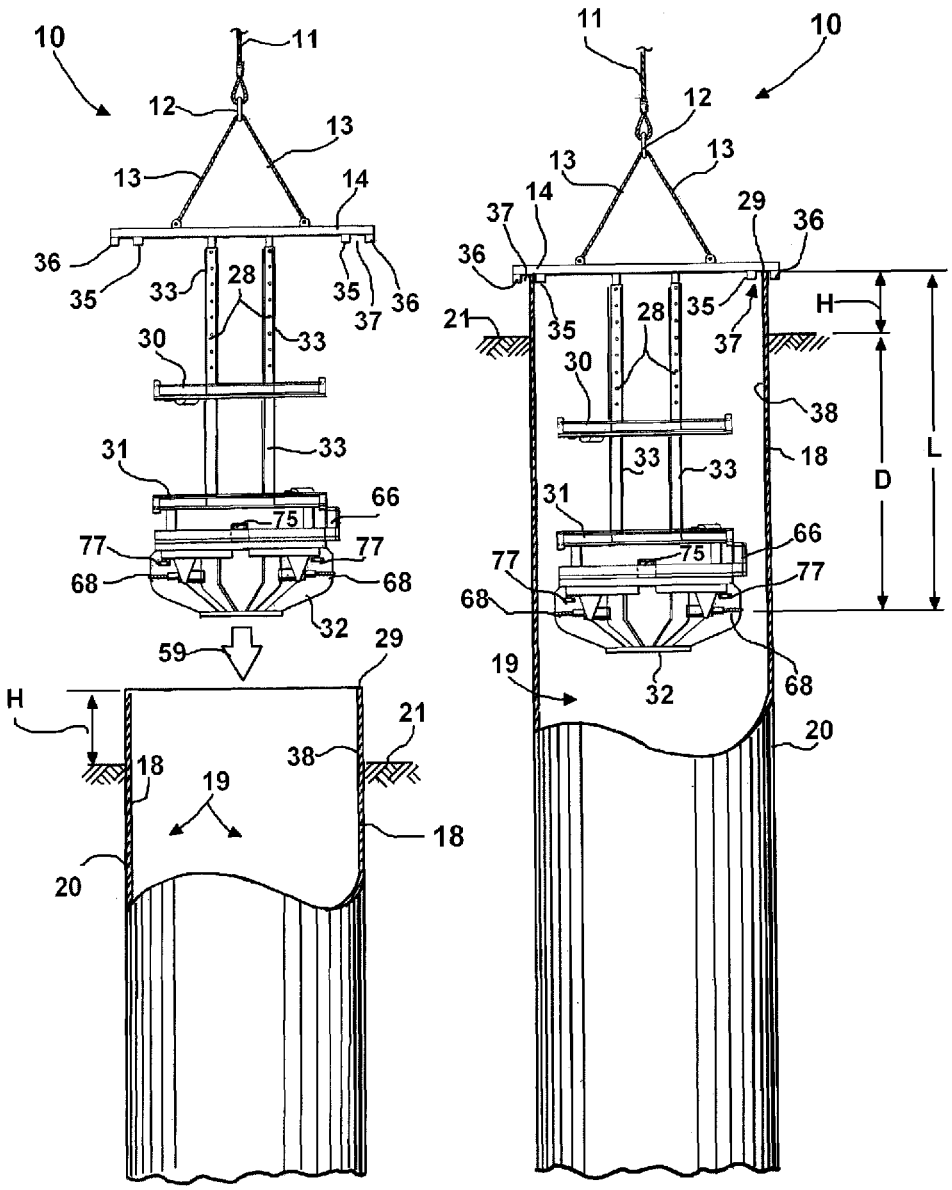
FIG. 6 shows the internal cutter being lowered into a caisson/jacket leg to be cut where the caisson/jacket leg extends an amount above the sea floor, and where all items are in a retracted condition (upper and lower sets of stabilizing arms along with double milling cutters).
FIG. 7 shows the internal cutter now resting on top of the caisson/jacket leg in preparation of a cut to be made below the sea floor.

Internal caisson/jacket leg cutter apparatus 10 can be lifted and lowered using a lift line 11 (e.g. crane lifting line) and rigging that can include a lifting ring 12 or like fitting and cables or slings 13 (such as shown in FIG. 6).

The internal caisson/jacket leg cutter apparatus 10 provides an upper frame 14 portion that can be used to rest the apparatus 10 upon a section of caisson/jacket leg 20 to be cut (for example see FIG. 7). The upper frame portion 14 can include peripheral beams 15 and diagonal beams 16. Upper frame portion 14 can be welded metal construction. Eyelets 17 or other suitable fittings are provided on upper frame portion 14 which can be used to form a connection between frame 14 and cables or slings 13 as shown.

Caisson/jacket leg 20 is typically a leg or a caisson of a massive caisson/jacket leg that was used to support an offshore marine platform, such as an oil and gas well drilling or production platform. Such caisson/jacket legs are known and can be of varying sizes in inches of about 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, or greater. In various embodiments cutting apparatus 10 can be used to cut caisson/jacket legs ranging between about any two of the above specified sizes. In various embodiments cutting apparatus 10 can be used to cut caisson/jacket legs greater than any one of the above specified sizes.

When a platform is removed from the marine environment, the legs 20 (or piling or any other tubular) of the caisson/jacket leg must be removed below the mud line 21 to a specified depth below the mud line (as indicated by "H" in FIG. 6). Removal is important because caisson/jacket legs 20 that remain in position are a hazard to navigation and to fishing boats that employ nets (such as shrimp boats).

In various embodiments the specified depth can be about 1, 2, 3, 4, 5, 6, 7, 8, 9, 10, 11, 12, 13, 14, 15, 16, 17, 18, 19, 20, 21, 22, 23, 24, and 25 feet. In various embodiments the specified depth of removal can be between a range between any two of the above specified depths of removal. In various embodiments cutting apparatus 10 can be used to cut caisson/jacket legs greater than any one of the above specified depths. In one embodiment cutting apparatus 10 can be adjustable to cut caisson/jacket legs greater than any one of the above specified depths by changing or adjusting adjustable legs or supports 33 (for example see FIG. 1). In one embodiment cutting apparatus 10 can be adjustable to cut caisson/jacket legs or supports between any two of the above specified depths by changing or adjusting adjustable legs 33.

A caisson/jacket leg 20 (such as shown in FIG. 6) is typically cylindrically shaped, providing a generally cylindrically shaped wall 18 and having an interior 19. In order to remove the caisson/jacket leg 20 at a position below the mud line 21, a cut 22 must be made through wall 18. The cut section 23 can then be removed by lifting using rigging 24 that can include a shackle 25 or other suitable lift fitting and a lift line 26 as shown by arrow 27 in FIG. 12.

Figures 10, 11:
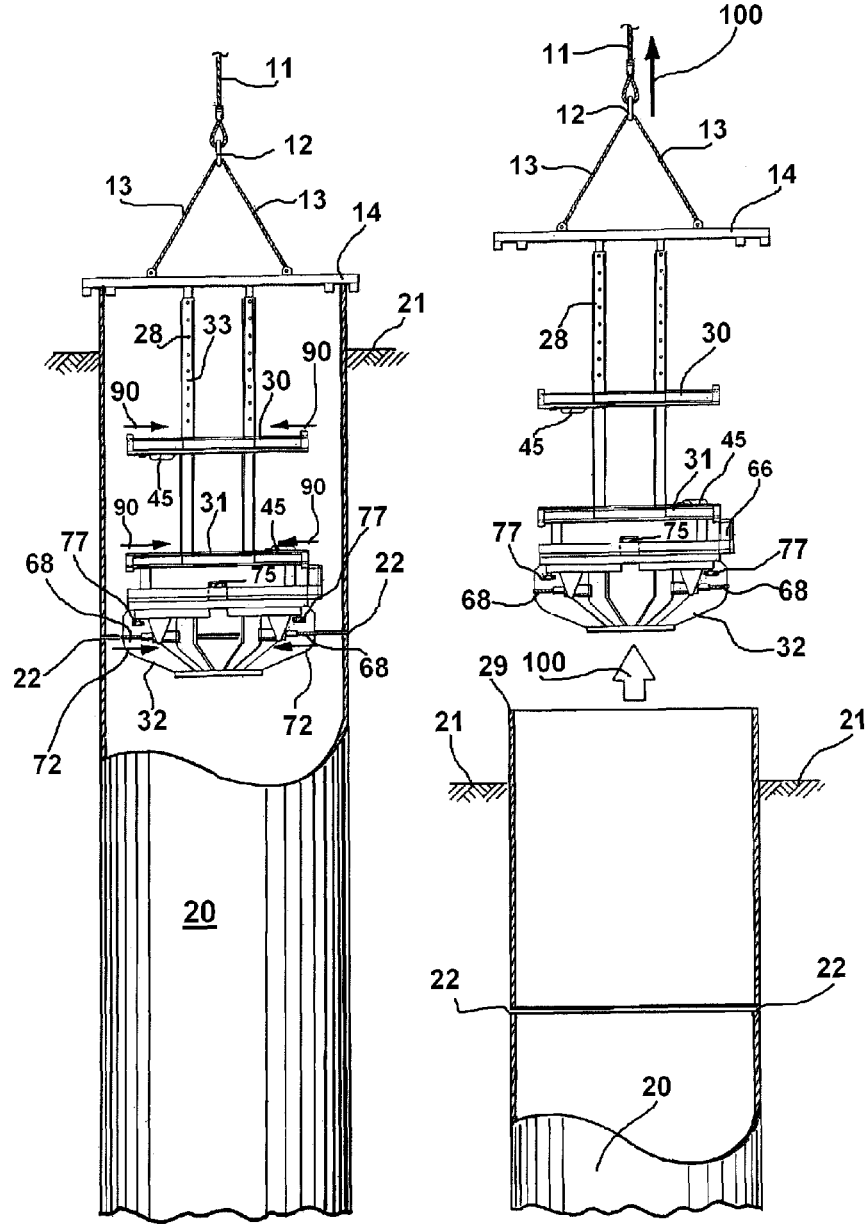
FIG. 10 schematically illustrates the step, after making a cut about the caisson/jacket leg, of retracting the double milling cutters along with the upper and lower sets of stabilizing arms.
FIG. 11 illustrates the step removing the cutting system from the now cut caisson/jacket leg.

In order to make the cut 22 (such as shown in FIG. 11), internal caisson/jacket leg cutter apparatus 10 can be lowered to a position located inside the caisson/jacket leg 20 to be removed as shown in FIGS. 6 and 7. In FIG. 7, the internal caisson/jacket leg cutter apparatus 10 has been positioned within interior 19 of caisson/jacket leg 20. In FIG. 6, arrow 59 schematically illustrates a lowering of the apparatus 10 into interior 19 of caisson/jacket leg 20 using lift line 11 and rigging 12, 13.

A plurality of vertical supports or legs 33 extend downwardly from disc 34. Disc 34 is attached to frame 14 (e.g. welded or bolted) as shown in FIGS. 1-2. Each of the vertical supports or legs 33 can be provided with a plurality of vertical adjustments openings 28. In one embodiment vertical adjustment openings 28 can be used to adjust the length "L" from the upper frame portion 14 to the location of the cutters 68 using pinned or bolted connections or other fasteners ("L" is schematically shown in FIG. 7). In this manner the depth of cut from the sea floor 21 can be determined based on the length L along with the height H of the upper edge 29 of caisson/jacket leg 20 compared to the sea floor 21.

In one embodiment vertical adjustment openings 28 can enable attachment of upper and lower spacing assemblies or centralizers 30, 31 to connect at a selected elevational position to vertical supports or legs 33. In one embodiment a plurality of adjustment openings 28 can also be included in the vertical supports or legs 33 between centralizers 30 and 31.

A cutter assembly 32 can be attached to the lower end portion of each of the vertical supports or legs 33. Stops 35, 36 can be attached to upper frame portion 14 for registering upper frame portion 14 upon the upper edge 29 of caisson/jacket leg 20 as shown in FIG. 7. The stops can include inner stops 35 and outer stops 36. A gap 37 is provided between each of the pair of stops 35, 36 (see FIGS. 1-2 and 6-10). The upper edge 29 of caisson/jacket leg 20 registers in the gaps 37 that are between pairs of stops 35, 36 as shown in FIG. 7.

Figure 3:
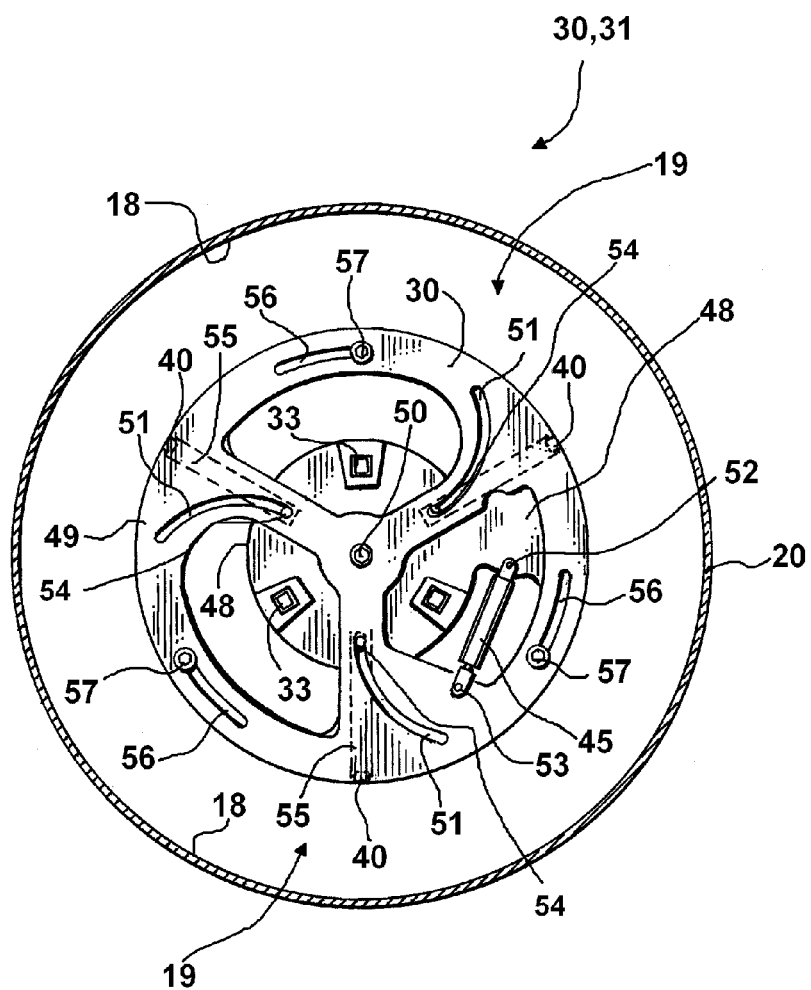
FIG. 3 is a top view of the upper set of stabilizing arms shown in a retracted condition.
Figure 4:
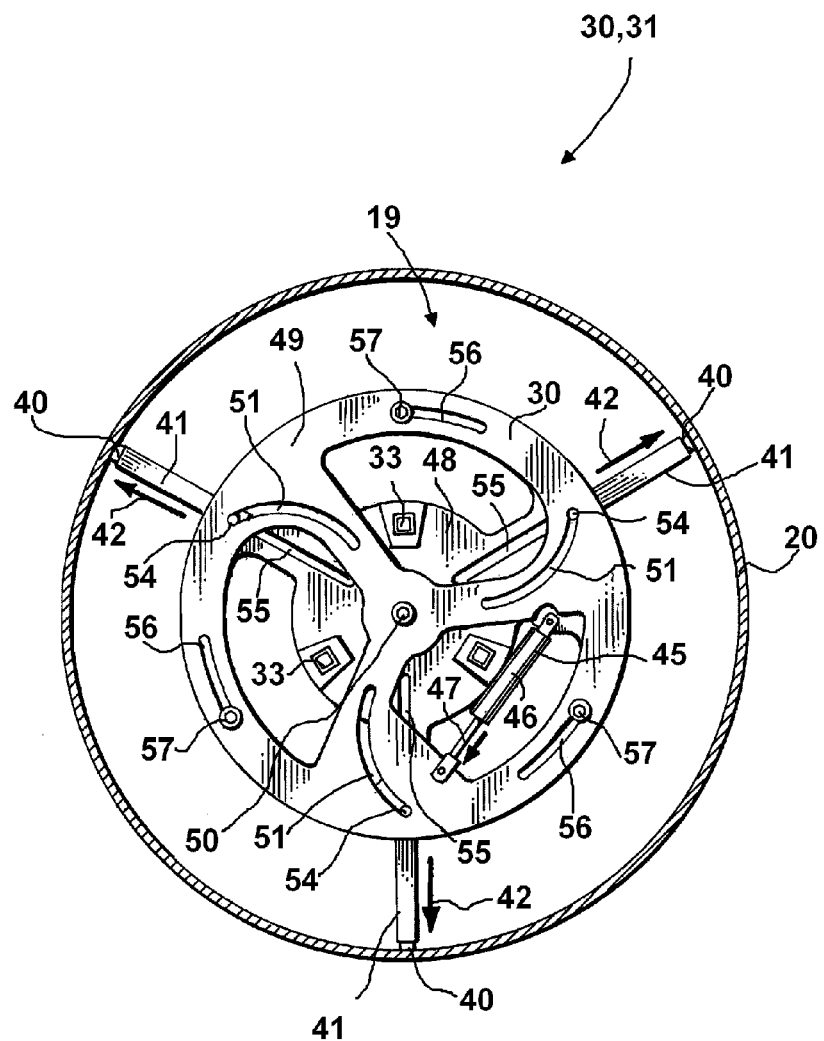
FIG. 4 is a top view of the upper set of stabilizing arms shown in an extended condition.

FIG. 3 is a top view of the upper set of stabilizing arms or spacing assemblies 30,31 shown in a retracted condition. FIG. 4 is a top view of the upper set of stabilizing arms or spacing assemblies 30,31 shown in an extended condition.

Each of the spacing assemblies 30, 31 can employ a plurality of stabilizing pads 40 and arms 41. The pads 40 engage the inside surface 38 of caisson/jacket leg 20 when the arms 41 are extended as shown by arrow 42 in FIGS. 2, 8 and 9.

Such engagement can stabilize cutting apparatus 10 while a cut is being made in caisson/jacket leg 20.

Each of the spacing assemblies 30, 31 can be of substantially the same construction. In one embodiment each spacing assembly 30, 31 can employ an extensible cylinder 45 operatively connected to the stabilizing pads 40. The extensible cylinder 45 can include cylinder 46 and pushrod 47 portions. The extensible cylinder 45 can be used to rotate a rotating plate 49 relative to a static plate 48. The plates 48, 49 can be connected with a rotary connection such as hub 50 or other suitable rotary bearing. In one embodiment curved slots 51 are provided in rotating plate 49. Straight slots 55 are provided in static plate 48. Each arm 41 provides a pin 54 that tracks both slots 51, 55 when cylinder 45 is expanded as illustrated in FIG. 4. The extensible cylinder 45 is attached to static plate 48 with pinned connection 52. The extensible cylinder 45 is attached to the rotating plate 49 with pinned connection 53. The extent of rotation of the rotating plate 49 relative to the static plate 48 can be controlled with stops or stop pins 57. These stop pins 57 can be attached (e.g. welded, bolted) to static plate 48 and travel in curved slots 56 of rotating plate 49. When the stop or stop pin 57 reaches an end of curved slot 56, the pin 57 limits the further rotation of the plate 49 relative to the plate 48. The stop pins 57 and slots 56 stabilize one plate 48 relative to the other plate 49. Spacers or bearings 39 can be positioned in between plates 48, 49. In one embodiment as rotating plate 49 rotates each of the plurality of stabilizing pads 40 extend a equal amount compared to the other stabilizing pads. In this manner a single extensible cylinder 45 can be used to extend and retract the plurality of stabilizing pads 40 on the particular spacing assembly as desired. In other embodiments each stabilizing pad can be connected to an individual extensible cylinders 45 for extension and retraction. For example, if there are three stabilizing pads 40, there can be three extensible cylinders which retract and extend as desired the respective stabilizing pad.

Figure 5:
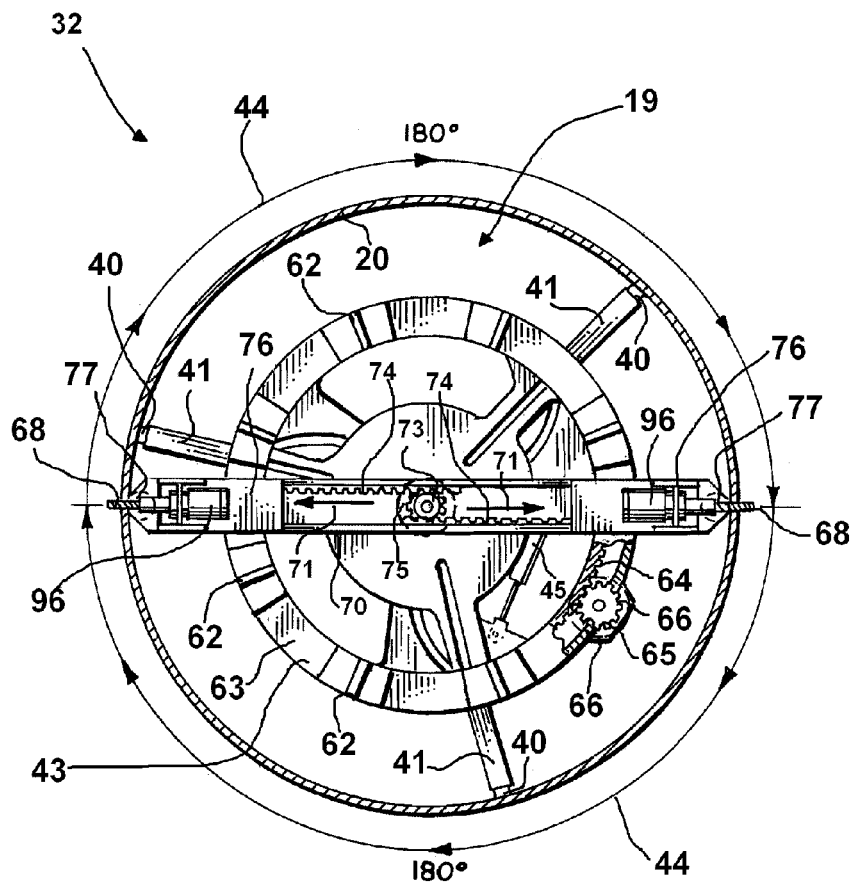
FIG. 5 is a bottom view of the positioning ring showing a double track expansion and retraction system for the double milling cutters, along with a driving gear rotationally positioning the positioning ring 180 degrees so that both cutters combine to make a 360 degree cut.

Cutter assembly 32 can be mounted to lower spacer assembly 31 using a plurality of spacers or hangers 58 and a rotational bearing assembly 43. FIG. 5 is a bottom view of the bearing assembly 43 showing a double track expansion and retraction system for the double milling cutters, along with a driving or pinion gear 65 rotationally positioning the positioning ring 180 degrees so that both cutters 68 combine to make a 360 degree cut (schematically indicated by two sets of 180 degree arrows). The bearing assembly 43 can comprise rotating 63 and non-rotating 67 rings. Bearing assembly 43 can be conventionally available such as the Low Clearance Split Frame offered by E.H. Wachs Company, 600 Knightsbridge Parkway, Lincolnshire, Ill. 60069.

In one embodiment cutter assembly 32 (such as shown in FIG. 6) employs a stabbing guide or positioning cutter frame 60 that includes a plurality of circumferentially spaced apart radially extending plates 62. Each radially extending plate 62 is attached to the rotating ring 63 of bearing assembly 43. Each plate 62 also attaches to plate 61. The rotating ring 63 carries an arcuate toothed rack 64. A pinion gear 65 of motor drive 66 engages the arcuate toothed rack 64 as shown in FIG. 5. Motor drive 66 can be mounted on an upper, non-rotating ring 67 of bearing assembly 43. In one embodiment motor 66 can be located on the interior of rotating ring 63 with arcuate toothed rack 64 also being located on the interior.

Arrows 44 in FIGS. 2 and 9 illustrate that ring 63 rotates relative to ring 67. Likewise, plates 62 and plate 61 rotates with ring 63. Also, the rotary mills 68 rotate with ring 63. Each mill 68 can be driven with motor drive 96. The mills 68 and motor drives 96 can be mounted on rail 70 to travel between retracted (FIGS. 1, 6-8 and 10-11) and extended (FIGS. 5, 9) positions. Arrows 71 in FIGS. 2, 5 and 9 illustrate travel of each mill 68 to the extended position. Arrows 72 in FIG. 10 illustrates travel of each mill 68 to the retracted position.

FIG. 5 illustrates that mills 68 can be moved between extended and retracted positions with a pinion gear 73 and toothed racks 74. Reversible motor drive 75 can rotate pinion gear 73. Rail 70 is attached to rotating ring 63 and rotates with ring 63. Toothed racks 74 can be mounted on sliding sections 76 that slide upon rail 70. Mills 68 and motor drives 96 travel with sliding sections 76.

Rollers 77 are provided on rail 70 next to mills 68 as shown in FIG. 5. The rollers 77 can be positioned to control a depth of cut for each mill 68, insuring that wall 18 of caisson/jacket leg 20 is properly cut and that mills 68 are not damaged. Rollers 77 enable only mills 68 and not motor drives 96 to engage wall 18 as seen in FIG. 5.

Figure 13:
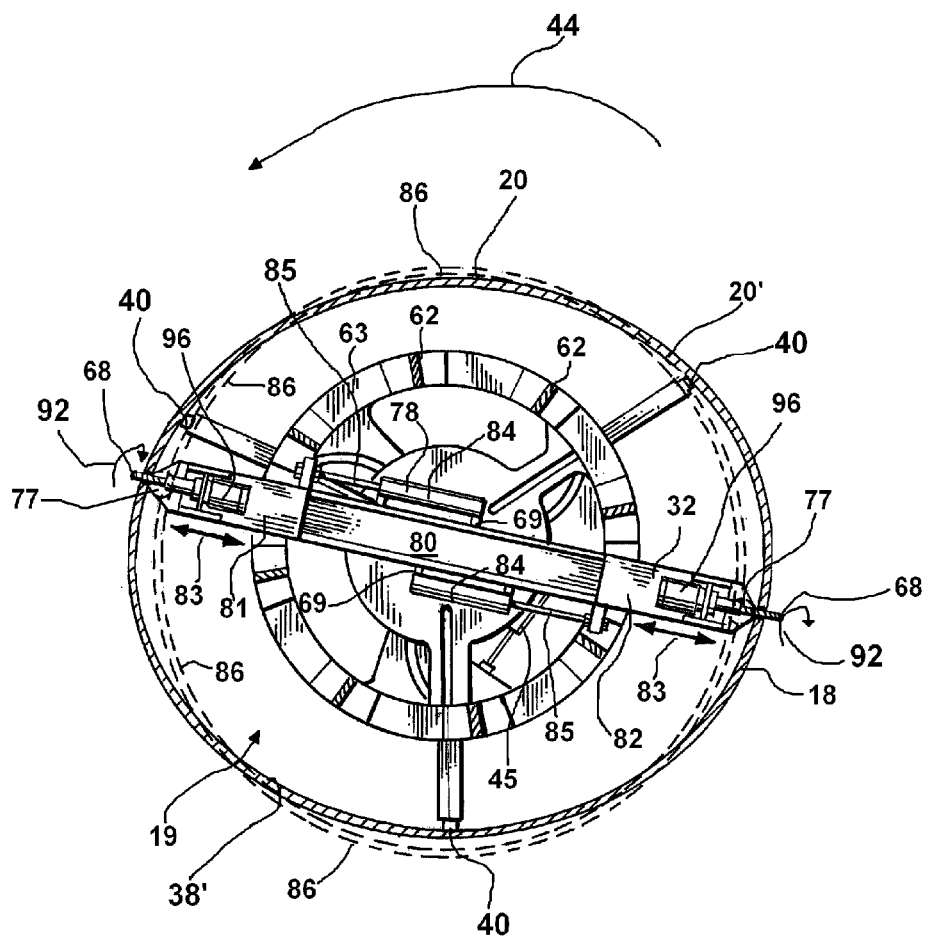
FIG. 13 shows a bottom view of an alternative embodiment where the double milling cutters are extended and retracted automatically with double hydraulic cylinders showing the system cutting an asymmetrically shaped caisson/jacket leg.

In one embodiment, where caisson/jacket leg 20 is not circular (such as shown in FIG. 13) but substantially symmetrically shaped, mills 68 can extend and retract to follow the shape of caisson/jacket leg 20. In this embodiment mills 68 can be extended until rollers 77 contact interior wall 18 of caisson/jacket leg 20 and mills 68 rotated in the direction of arrows 44. However, as mills 68 are rotated in the direction of arrow 44 the wall 18 of caisson/jacket leg 20 can become farther away from mills 68 causing rollers 77 to lose contact with wall 18. Where a motor 75 is energized (such as by the application of a specified hydraulic pressure) during rotation in the direction of arrow 44, motor 75 can cause mills 68 to extend further until contact is made between rollers 77 and interior wall 18. In the alternative, as mills are rotated in the direction of arrow 44 wall 18 of caisson/jacket leg 20 can become closer placing increases pressure on rollers 77. Such increased pressure on rollers 77 can overcome the resistance of motor 75 allowing mills 68 to retract until motor 75 can overcome the back pressure caused by contact forces between rollers 77 and interior wall 18. In this manner changing dimensions in caisson/jacket leg 20 can be automatically addressed as mills 68 are rotated in the direction of arrows 44. In other embodiments mills 68 can be rotated in the opposite direction of arrows 44.

FIG. 6 shows the internal cutter apparatus 10 being lowered into a caisson/jacket leg 20 to be cut where the caisson/jacket leg 20 extends an amount H above the sea floor 21, and where all items are in a retracted condition (upper and lower sets of stabilizing arms and pads 40 along with double milling cutters 68). FIG. 7 shows the internal cutter apparatus 10 now resting on top 29 of the caisson/jacket leg 20 in preparation of a cut to be made below the sea floor 21 (at a depth D).

FIG. 8 schematically illustrates the step of extending the upper and lower sets of stabilizing arms and pads 40 (schematically indicated by arrows 42). Stabilizing apparatus 10 during the cut will assist in making a complete cut 22 around caisson/jacket leg 20.

FIG. 9 schematically illustrates the step of extending the double milling cutters 68 (schematically indicated by arrows 71) and the step of rotating the positioning ring 32 while cutters 68 are making a cut in caisson/jacket leg 20. Preferably, cutters 68 are extended in the direction of arrows 71 without positioning ring 32 being rotated in the direction of arrow 44. Cutters 68 are rotated in the directions of arrows 92 and make the initial cut into and through wall 18. After penetrating wall 18 and rollers 77 contacting interior 38 or wall 18, positioning ring 32 can be rotated in the direction of arrow 44 (or in the opposition direction of arrow 44). After penetration, continued rotation of cutters 68 in the direction of arrows 92 (or in the opposite direction of arrows 92) along with rotation of positioning ring 32 in the direction of arrow 44 will allow a cut 22 to be made in caisson/jacket leg 20. For a complete cut to be made in caisson/jacket leg 20 it is preferred that positioning ring 32 be rotated at least 180 degrees. In this manner each of the cutters 68 will make at least a 180 degree cut 22' and 22" in caisson/jacket leg 20 with the combined cut being at least 360 degrees (schematically indicated by the double sets of 180 degree arrows in FIG. 5).

In an alternative embodiment only a single cutter 68 is used. In this embodiment positing ring 32 should be rotated at least 360 degrees in the direction of arrow 44. In another alternative embodiment three cutters 68 symmetrically and radially spaced can be used. In this alternative embodiment positioning ring 32 should be rotated at least about 120 degrees in the direction FIG. 10 schematically illustrates the step, after making a cut 22 about the caisson/jacket leg 20, of retracting the double milling cutters 68 (schematically indicated by arrows 72) along with the upper and lower sets of stabilizing arms or pads 40 (schematically indicated by arrows 90).

FIG. 11 illustrates the step removing (schematically indicated by arrows 100) the cutting system 10 from the now cut caisson/jacket leg 20.

Figure 12:
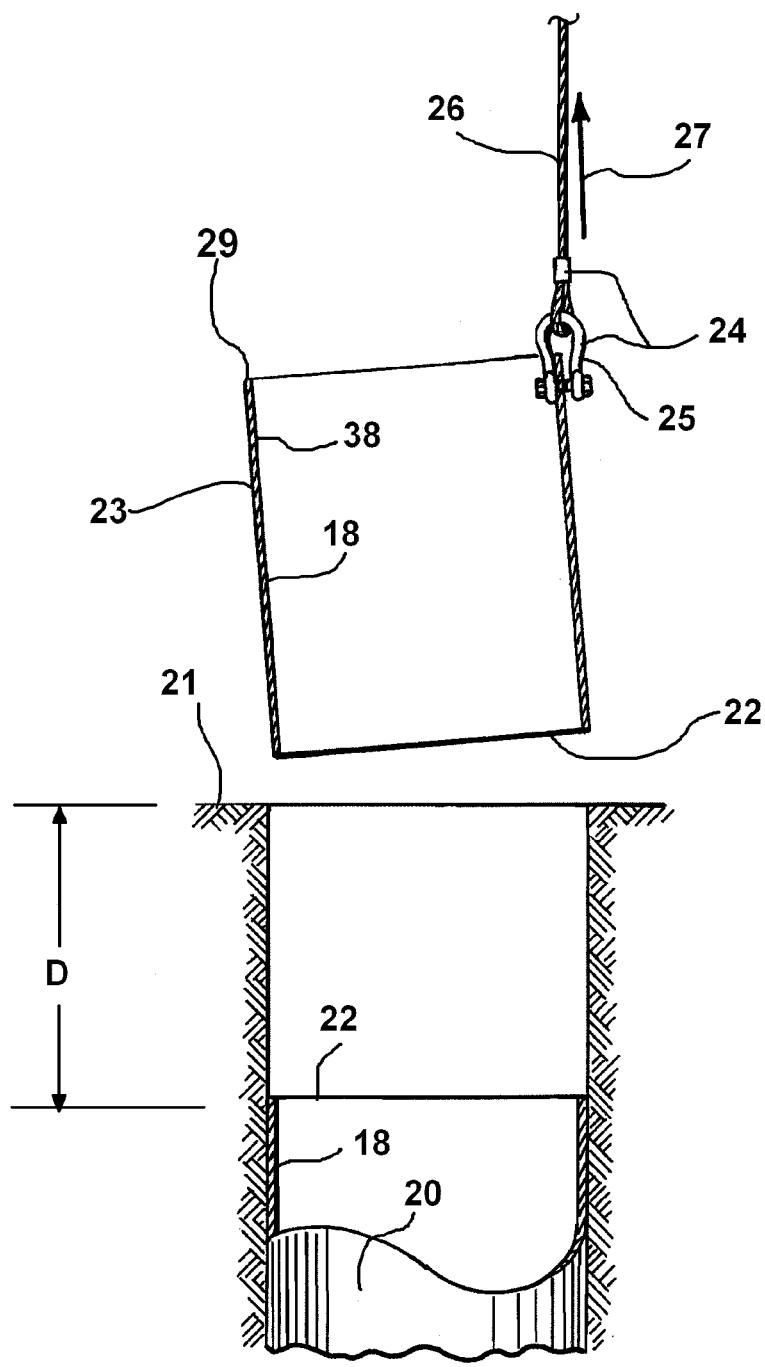
FIG. 12 illustrates the step of removing the cut portion of the caisson/jacket leg and showing the remaining caisson/jacket leg located at a depth below the sea floor.

FIG. 12 illustrates the step of removing (schematically indicated by arrow 27) the cut portion 23 of the caisson/jacket leg 20 and showing the remaining caisson/jacket leg 20 located at a depth below the sea floor at a depth D.

Figure 14:
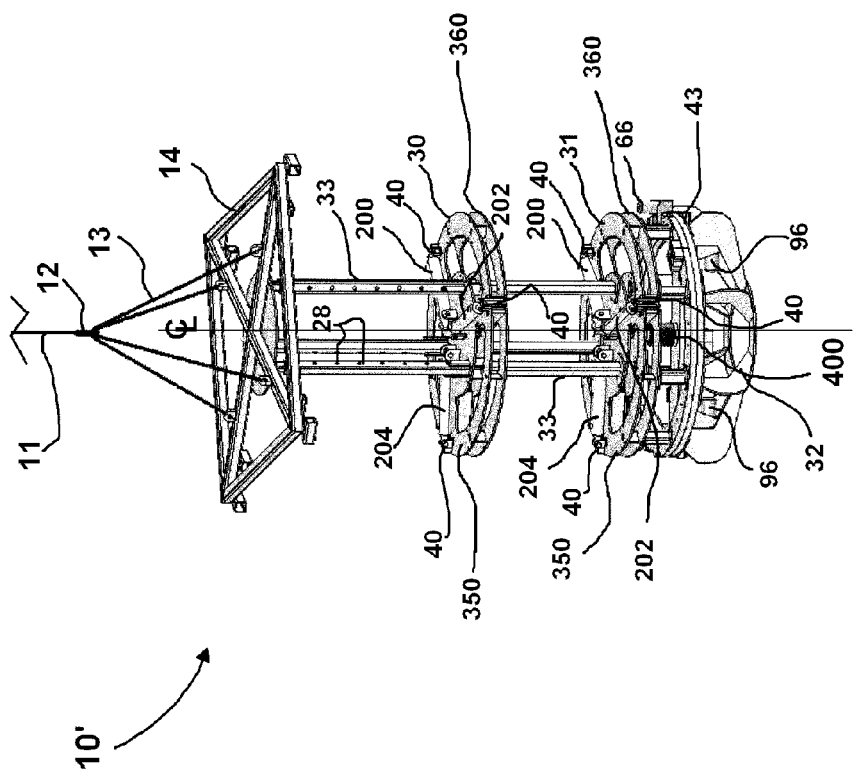
FIG. 14 is a perspective view of an alternative embodiment from FIG. 13 now having upper and lower stabilizer sections each with a plurality of hydraulic cylinders for extending and retracting the stabilizing arms where the stabilizing arms are in a retracted state.
Figure 15:
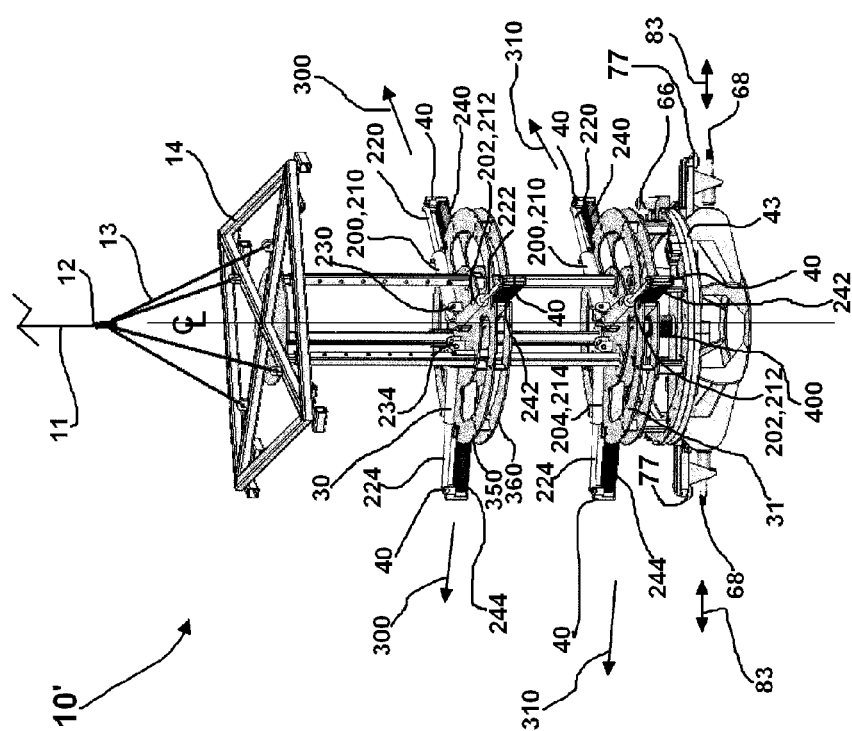
FIG. 15 shows the embodiment of FIG. 14 where the stabilizing arms have been extended along with the double milling cutters being in an extended state.

FIGS. 14 through 17 show an alternative embodiment for upper and lower spacing/stabilizer sections 30,31. FIG. 14 is a perspective view of an alternative embodiment from FIG. 13 now having upper and lower stabilizer sections 30,31 each with a plurality of hydraulic cylinders (200,202,204) for extending and retracting the stabilizing arms (240,242,244 with pads 40) where the stabilizing arms are in a retracted state. FIG. 15 shows stabilizing arms (240,242,244) in an extended state along with the double milling cutters 38 being in an extended state.

In this alternative embodiment each stabilizing/spacing section 30,30 can comprise upper and lower plates 350,360; a plurality of stabilizing arms (e.g., 240,242,244) which can be radially and symmetrically disposed about a central axis CL of the apparatus 10'. In this embodiment three stabilizing arms 240,242,244 are shown radially spaced apart at 120 degree increments. Stabilizing arms 240,242,244 can be contained and slidably connected to upper and lower plates 350, 360. Operatively connected to each stabilizing arm can be a hydraulic cylinder (respectively 200,202,204). Each hydraulic cylinder can include a push rod (respectively 240,242, 244).

Figure 16:
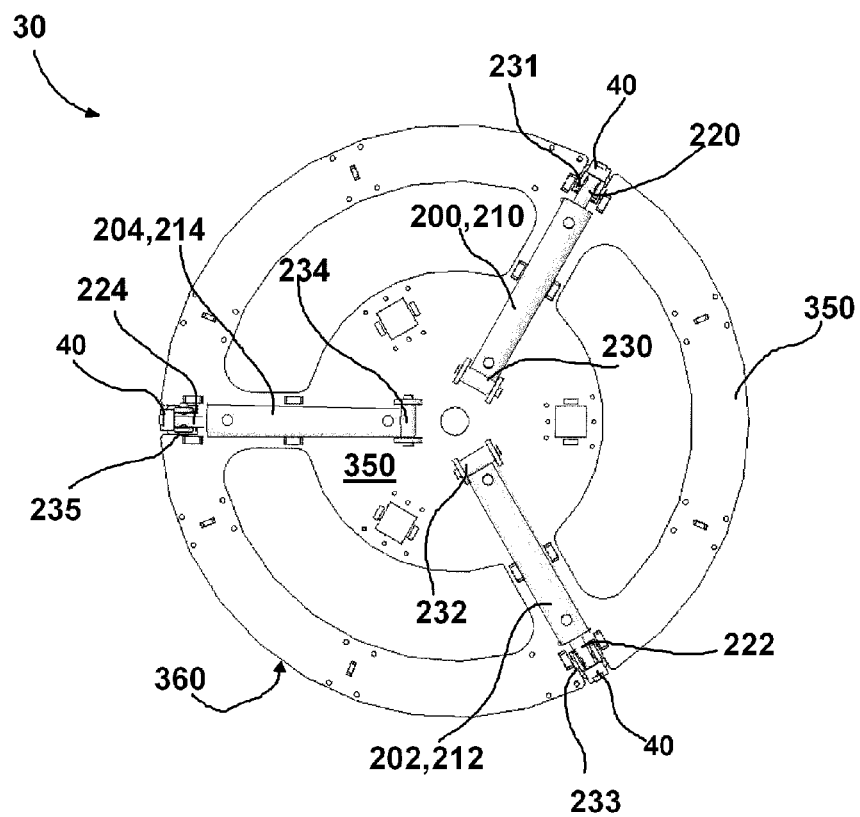
FIG. 16 is a top view of one of the stabilizing sections showing the stabilizing arms in a retracted state.
Figure 17:
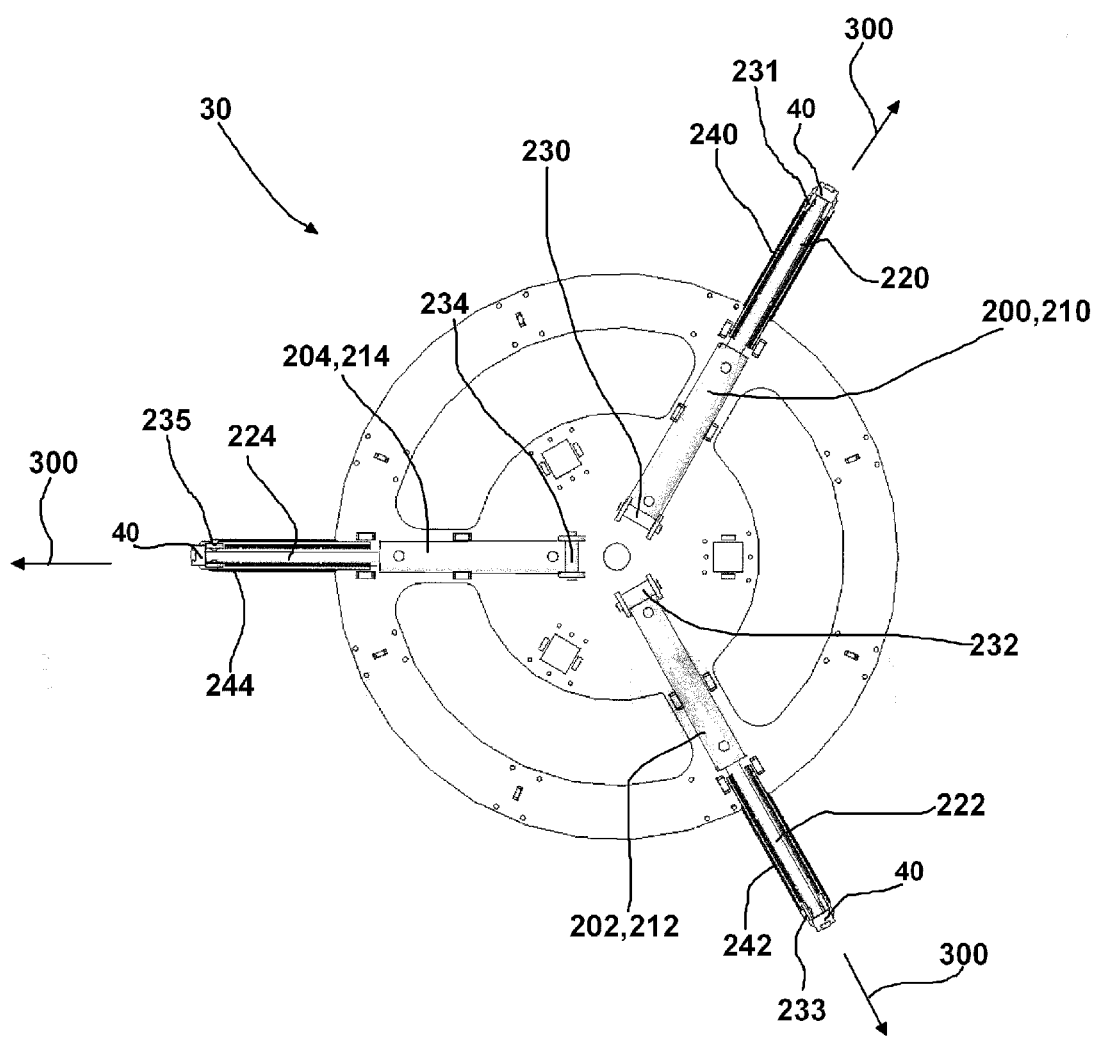
FIG. 17 is a top view of the stabilizing section of FIG. 16 where the stabilizing arms are in an extended state.

FIG. 16 is a top view of stabilizing section 30 showing stabilizing arms 240,242,244 in a retracted state. FIG. 17 is a top view of stabilizing section 30 where stabilizing arms 240,242,244 are in an extended state. Arrows 300 schematically indicated that stabilizing arms can be extended and retracted. To stabilize apparatus 10', stabilizing arms 240, 242,244 can be extended until pads 40 contact the interior surface of the item to be cut.

Figure 18:
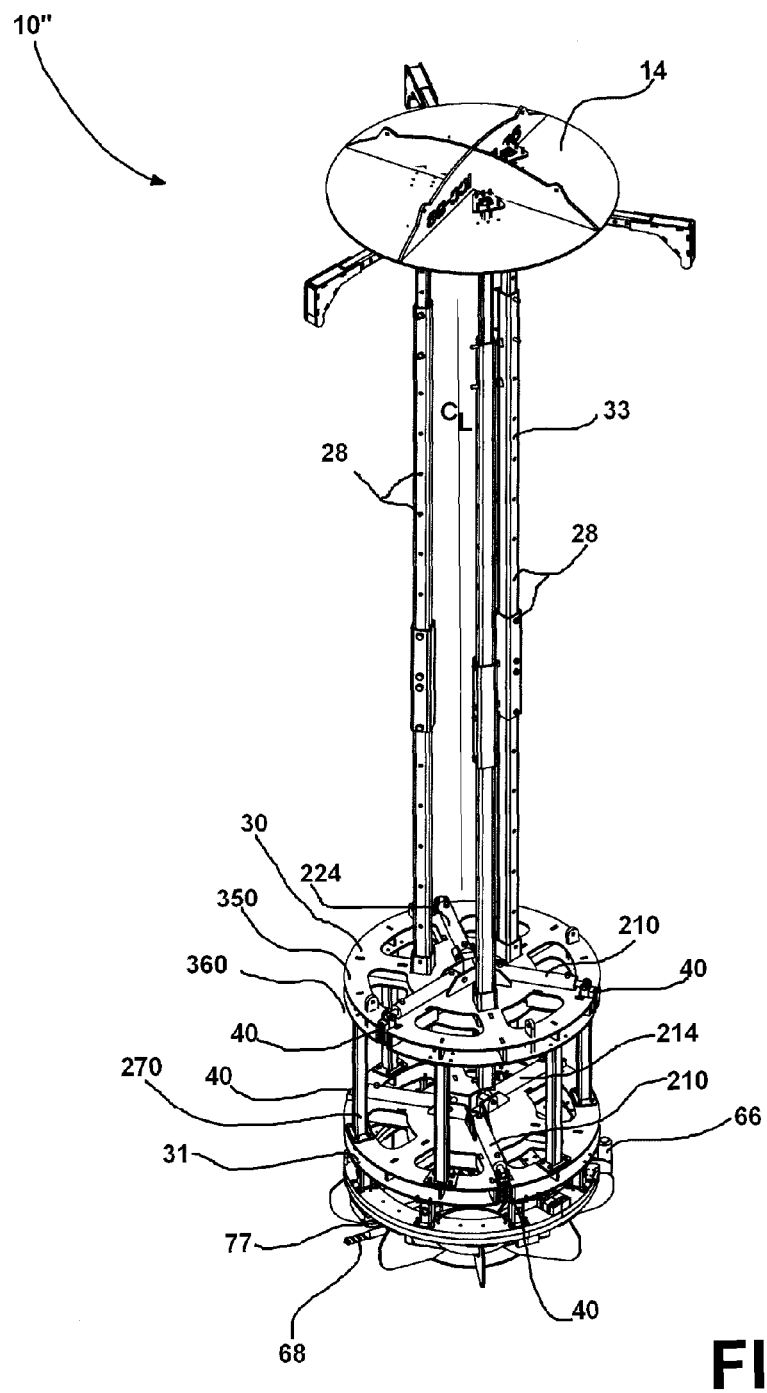
FIG. 18 is a perspective view of an alternative embodiment having upper and lower stabilizer sections each with a plurality of hydraulic cylinders for extending and retracting the stabilizing arms where the stabilizing arms are in a retracted state.
Figure 19:
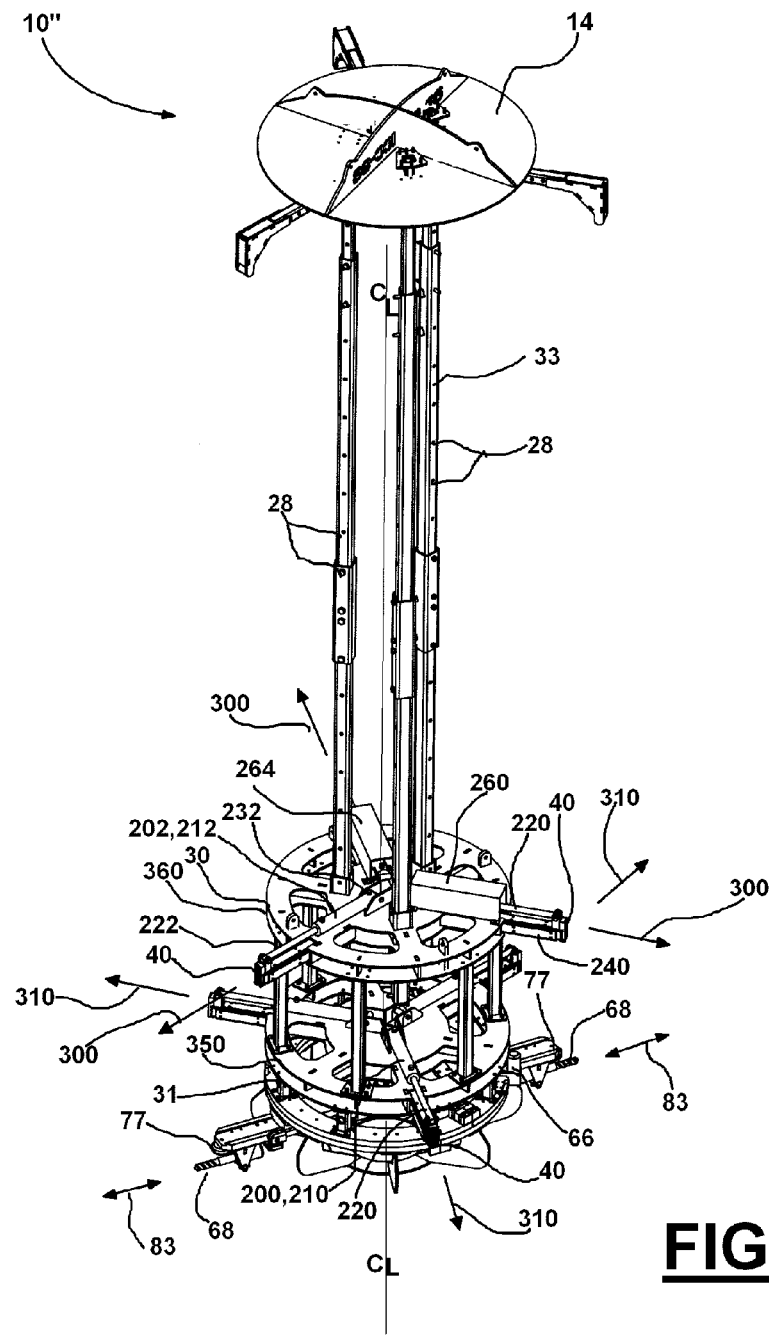
FIG. 19 shows the embodiment of FIG. 18 where the stabilizing arms have been extended along with the double milling cutters being in an extended state, and showing hydraulic piston guards on some of the extension cylinders.
Figure 23:
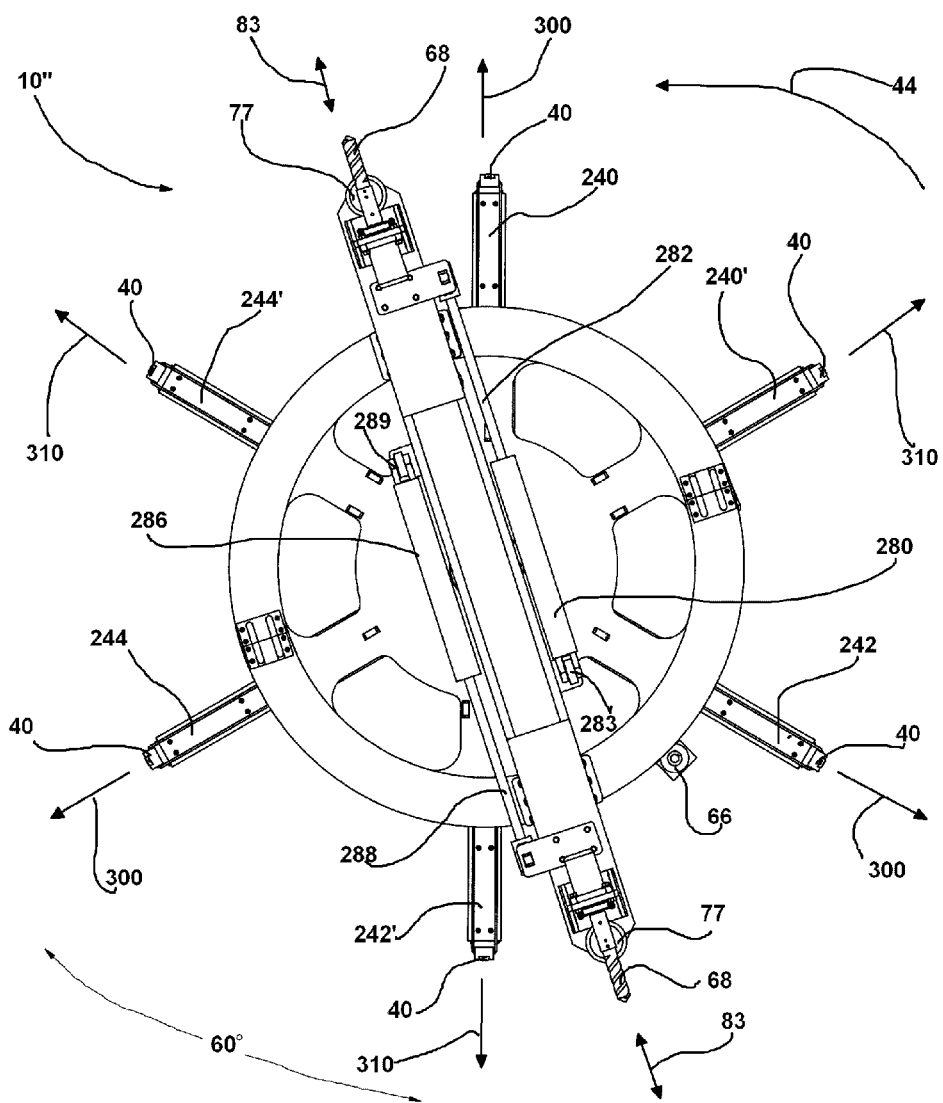
FIG. 23 shows the view of FIG. 22 with the double milling cutters in an extended state.

FIG. 18 is a perspective view of an alternative embodiment 10" having upper and lower stabilizer 30,31 sections each with a plurality of hydraulic cylinders (respectively 200,202, 204) for extending and retracting the stabilizing arms (respectively 240,242,244) where the stabilizing arms are in a retracted state. FIG. 19 shows the embodiment of FIG. 18 where the stabilizing arms 240,242,244 have been extended (schematically indicated by arrows 300 and 310) along with the double milling 68 cutters being in an extended state (schematically indicated by double arrows 83), and showing hydraulic piston guards (260 and 264) on some of the extension cylinders (respectively 210 and 214). In this embodiment the stabilizing arms for upper section 30 are out of phase with the stabilizing arms for lower section 31 (such as by sixty degrees as shown in FIG. 23) which can help increase the overall stability of apparatus 10" when making a cut on an irregularly shaped member. In one embodiment hydraulic piston guards can be placed around all hydraulic cylinders.

Figure 20:
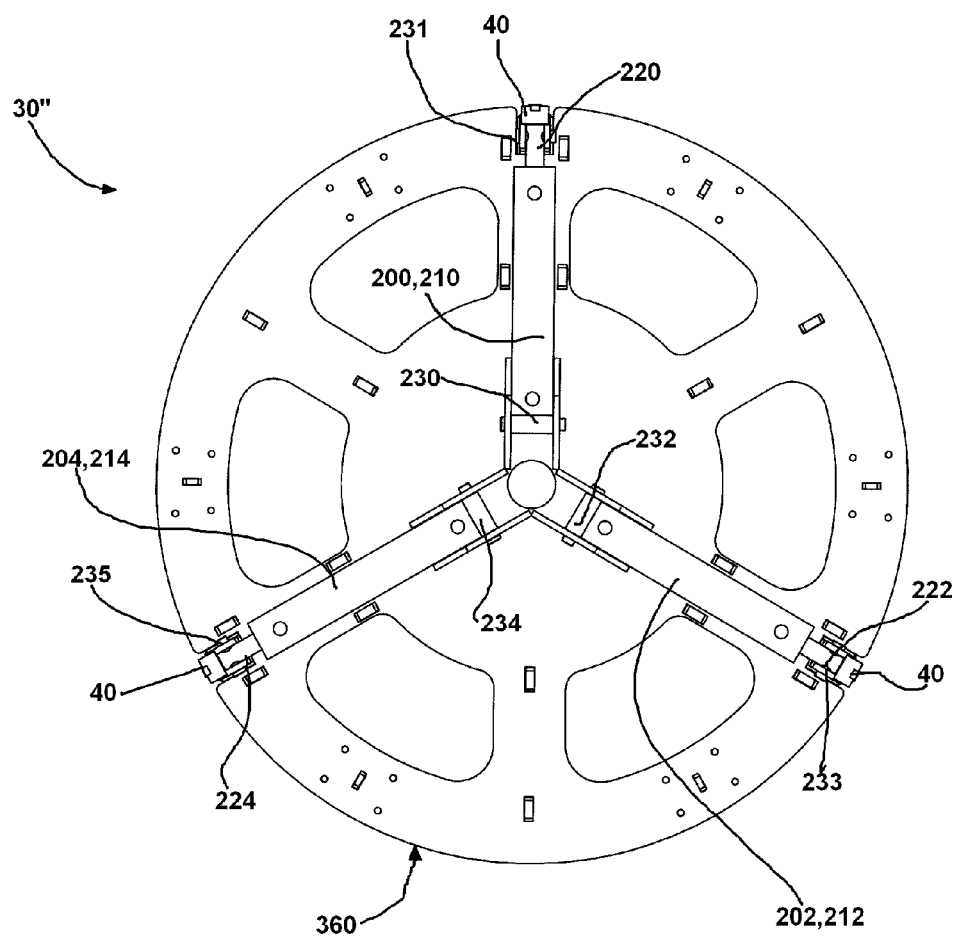
FIG. 20 is a top view of one of the stabilizing sections of FIG. 18 showing the stabilizing arms in a retracted state.
Figure 21:
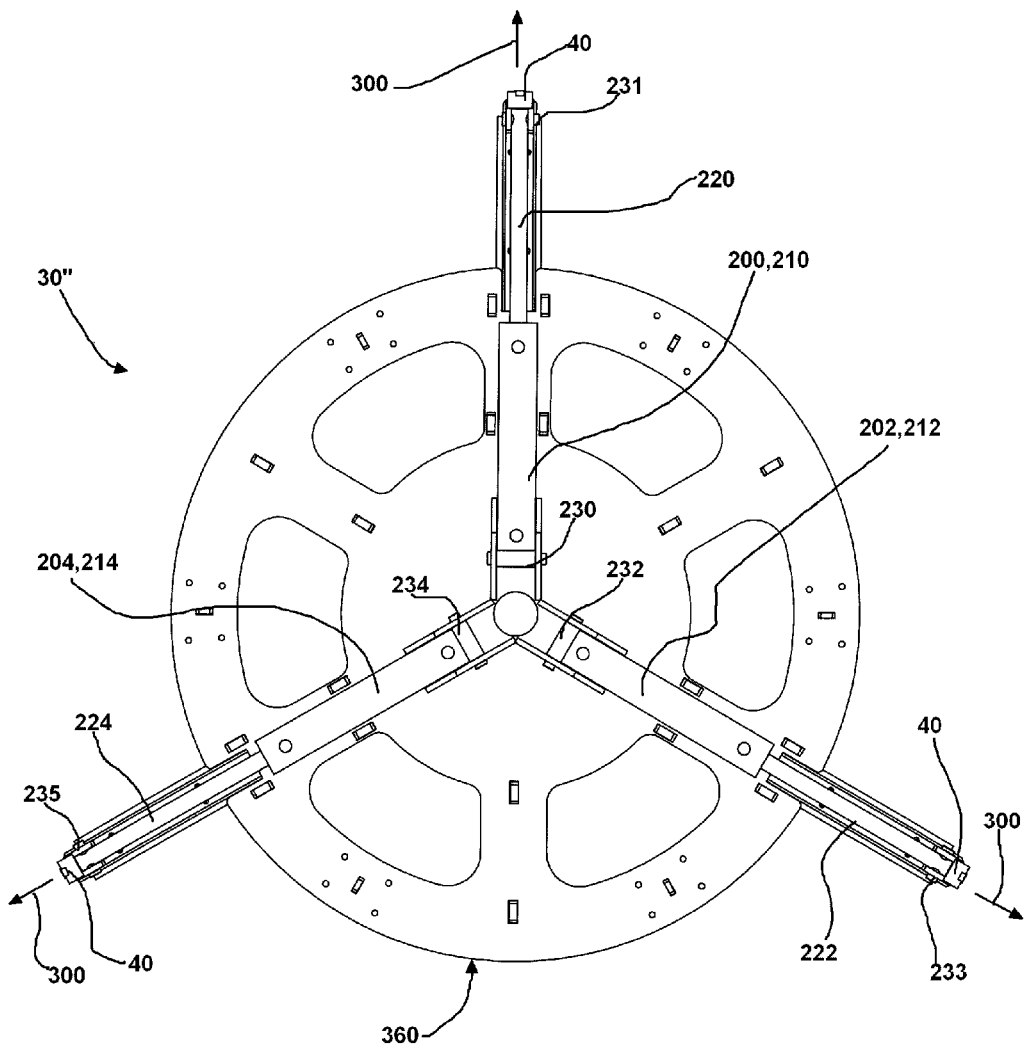
FIG. 21 is a top view of the stabilizing section of FIG. 18 where the stabilizing arms are in an extended state.

FIG. 20 is a top view of one of the stabilizing sections of FIG. 18 showing the stabilizing arms in a retracted state. FIG. 21 is a top view of the stabilizing section of FIG. 18 where the stabilizing arms are in an extended state.

FIG. 13 shows a bottom view of an alternative embodiment where the double milling cutters 68 are extended and retracted automatically with double hydraulic cylinders 78 and 79, where the system is cutting an asymmetrically shaped caisson/jacket leg 20' compared to a symmetrically shaped caisson/jacket leg 20 (shown in dashed lines). In FIG. 13, each cutting mill 68 and motor drive 96 is moved independently of the other using extensible cylinders 78, 79. Rail 80 is attached to and rotates with rotating ring 63. Each cylinder 78 or 79 moves a sliding section 81 or 82. Each sliding section slides upon rail 80 between extended and retracted positions as indicated by arrows 83 in FIG. 13. Each cylinder 78, 79 employs a cylinder body 84 and extensible pushrod 85. Each cylinder body attaches to rail 80 with attachments 69 (e.g. welded, bolted) as seen in FIG. 5. The embodiment of FIG. 13 can be useful if caisson/jacket leg 20 has an irregular cross section, as indicated schematically by phantom lines 86 in FIG. 13, as the movement of one mill cutter 68 and motor drive 96 is independent of the other. This embodiment can automatically accommodate non-symmetrical changes in dimension of caisson/jacket leg 20 during the cutting process.

Figure 22:
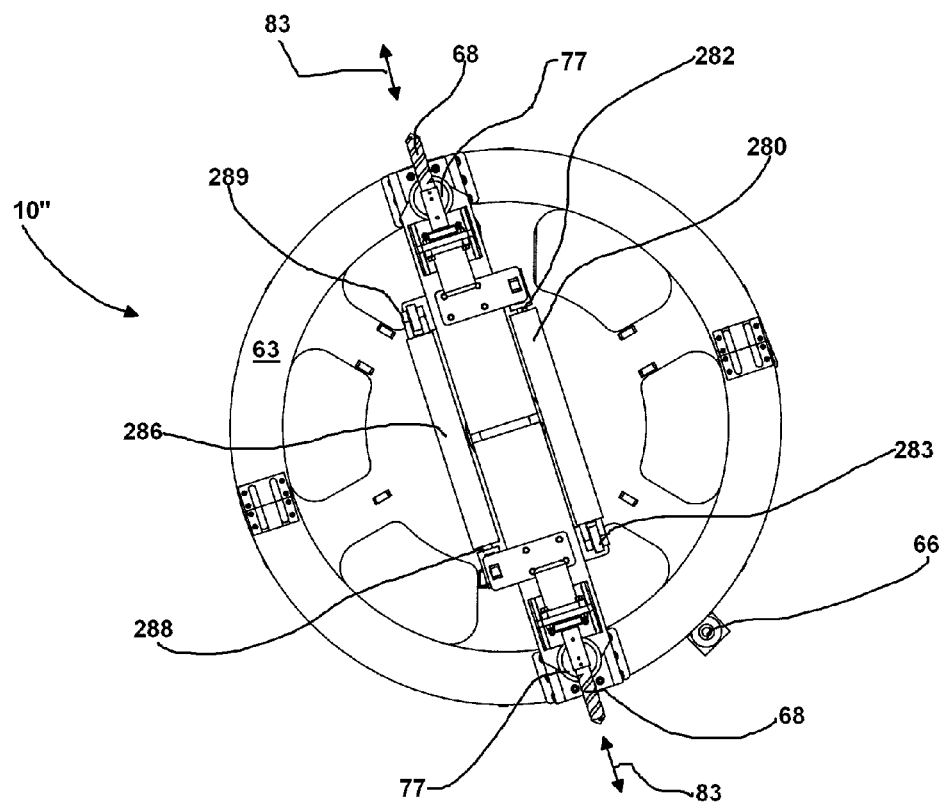
FIG. 22 is a bottom view of the embodiment shown in FIGS. 18 and 19 showing a double hydraulic piston expansion and retraction system for the double milling cutters, along with a driving gear rotationally positioning the positioning ring.

FIG. 22 is a bottom view of the embodiment shown in FIGS. 18 and 19 showing a double hydraulic piston expansion and retraction system (cylinder/rods 280/282 and 286/288) for the double milling cutters 68, along with a driving gear motor 66 rotationally positioning the positioning ring 63. FIG. 23 shows the view of FIG. 22 with the double milling cutters 68 in an extended state. In one embodiment cylinders 280 and 286 can be pivotally connected to ring 63 (respectively by pivoting pins 283 and 289).

Although not shown (for clarity), in one embodiment a flow diverter can be used to control the rate and/or amount of extension of each push rod 220,222,224 so that each stabilizing arm will extend respectively at about the same rate and about equal amounts. Extending equally can substantially center the centerline CL of apparatus 10' in the item to be cut which can assist keeping the item to be cut within the cutting area of double milling cutters 68 (even where double milling cutters 68 can extend and retract during a cut (schematically indicated in FIG. 13).

In one embodiment a 6-way hydraulic flow diverter (not shown for clarity) can be employed on the tool 10,10' to simultaneously direct the hydraulic fluid, supplied via a control valve on the surface (not shown for clarity), in equal volumes to each of the six anchor/centralizer hydraulic cylinders (200,202,204) that are independent and attached to each of the six anchor/centralizer arms (240,242,244). The equal supply of fluid provided by the flow diverter ensures that each arm substantially simultaneously extends the same distance measured from the center line CL of the cutting tool 10,10'. Once the pads 40 of the arms (240,242,244) on each centralizer section (30,30) come in contact with the interior wall (18 or 86) of the caisson, the arms (240,242,244) act to centralize the cutting tool 10,10' within the caisson. The flow diverter can substantially ensure that an equal amount of pressure, monitored and controlled from the surface control panel (not shown for clarity), is applied to each arm (240,242, 244) to maintain a constant and equal anchoring force.

In one embodiment the anchoring arms (240,242,244) can serve to: (a) centralize the cutting tool 10,10' along the center line (CL) of the caisson being cut; (b) stabilize the cutting tool 10,10' to prevent upward or downward movement during the cutting process; and (c) provide anchoring force to oppose the counter rotational force created by the resistance of the mill bits 38 against the material being cut during the cutting process (cutting schematically indicated by arrow 44).

In one embodiment each hydraulic cylinder can be pivotally connected to upper plate 350 (respectively at pivot points 230,232,234). In one embodiment each pushrod or arm can also be pivotally connected to its respective stabilizing arm. Being pivotally connected to both upper plate 350 and the respective stabilizing arm allows each hydraulic cylinder to absorb differential vertical movement between the stabilizing arm and stabilizing/spacing section 30.

In one embodiment a flow diverter 400 can be used to control the extension and retraction of double cylinders 84 and double pushrods 85 (shown in FIG. 13).

Typical Method of Subsea Operation

The following includes steps in one embodiment for operating the cutting saw in a subsea environment:

Sequence of Operations

1. SEVER Caisson/jacket leg ABOVE THE MUD LINE APPROXIMATELY 5 FEET ABOVE THE MUD LINE (IF REQUIRES).

2. LOWERING THE CUTTER 10 INTO THE CASING 20

(a) Adjust the upper depth of legs or supports 33 to position the cut at the proper desired depth "D" (schematically indicated by "L" in FIG. 7) below the top of the casing 20. The adjustment is achieved by removing the bolts (adjustment openings 28) on the telescopic legs or supports 33, and then inserting the bolts (adjustment opening 28) at the required locations.

(b) Ensure that the cutting mills 68 dovetail slides are in the fully retracted position (FIG. 6 shows retracted position). The centralizers (spacing assemblies 30 and 31) should also be in the fully retracted position.

(c) Lower the entire tool 10 into the casing (schematically shown in FIGS. 6 and 7). The stabbing guide 60 will help to protect the retracted milling cutters 68 from contacting the casing wall 18 upon entrance into the casing 20. Continue to lower the tool 10 until the casing top stop or upper frame 14 contacts the top 29 of the casing 20 (shown in FIG. 7).

(d) In an alternative embodiment raise the tool 10 approximately 1 foot to ensure that the tool 10 is hanging from the crane, and not resting on the top stop or upper frame 14. (If the casing 20 is cut unevenly on the top 29, this uneven cut could cause the tool 10 to sit cocked or off center to the casing 20 if it were allow to rest on the top 29.)

3. Making a Cut (a) Extend the centralizers (upper and lower centralizers—spacing assemblies 30 and 31) by actuating the extend centralizers lever on the control console (located above the surface of the water and not shown for clarity). The clamping pressure can be adjusted by using the centralizer clamp pressure relief valve and pressure gauge on the control console.

(b) Begin rotating the cutting mill bits 68 (in the direction of arrows 92) by actuating the rotate mill bits lever on the control console (located above the surface of the water and not shown for clarity). The maximum cutting torque can be adjusted by using the cutting torque relief valve and pressure gauge on the control console.

(c) Extend the cutting mill dovetail slides (schematically indicated by arrows 71 in FIGS. 5 and 9) by actuating the extend mill slides lever on the control console (located above the surface of the water and not shown for clarity). The maximum extend force can be adjusted by using the mill extend force relief valve on the control console. The slides will extend until the guide rollers 77 contact the inside diameter 38 of the pipe 20 (contact is shown in FIG. 9).

(d) Rotate in the direction of arrow 44 the bottom ring 63 by actuating the bottom ring rotate lever on the control console (located above the surface of the water and not shown for clarity). The maximum torque can be adjusted by using the bottom ring rotate relief valve and pressure gauge on the control console. The bottom ring 63 can rotate 360 degrees continuously. However, only 180 degrees should be necessary to make a cut in the preferred embodiment.

4. Removing the Cutter from the Casing.

(a) Stop the bottom ring 63 rotation.
(b) Retract the milling cutter 68 slides.
(c) Stop the milling cutter bits 68.
(d) Retract the centralizers (pads 40 for upper and lower spacing assemblies 30 and 31).
(e) Remove the tool 10 from the cut casing 20.

Description of Hydraulic Methods used for Operation

1A. Cylinder Centralizers (a) In one embodiment (FIGS. 14 through 17) each centralizer (upper 30 and lower 31) (pads 40 for upper and lower spacing assemblies 30 and 31) is actuated by three hydraulic cylinders (200,202,204). Each hydraulic cylinder (200,202, 204) is connected to a telescopic arm (240,242,244) made of square tubing with a toothed die affixed to one end to grip the inside diameter of the pipe.

(b) Both the upper and lower centralizers (30,31) can be operated (pads 40 for upper and lower spacing assemblies 30 and 31) for extension and retraction by a single control lever (located above the surface of the water and not shown for clarity). The upper and lower centralizers extension and retraction can be synchronized by utilizing a synchronizing rotary flow divider. This type of valve allows all cylinders (200, 202, 204) to move at substantially the same rate. However, should one centralizer (30 or 31) contact and clamp the casing/pipe/caisson/jacket leg 20 before another, the non-contacting centralizer can still allowed to extend and clamp the casing/pipe/caisson/jacket leg 20.

(c) A pressure control valve will be used on the extend side of the cylinders (200,202,204) to control the maximum force output of the cylinders. This will limit the force between the centralizer arms (240,242,244 and pads 40) and the inside diameter of the casing/pipe/caisson/jacket leg 20.

1B. Rotational Centralizers (a) In one embodiment each centralizer (upper and lower) (pads 40 for upper and lower spacing assemblies 30 and 31) is actuated by a single hydraulic cylinder 45. Extending or retracting the cylinder causes a rotation of the centralizer cam ring (rotating plate 49). The cam ring 49 has three curved cam slots 51. These cam slots 51 are cut in such a manner that given a constant rotational torque, the linear force output at the centralizer arm 41 will be a constant anywhere on the path of the cam. As the cam ring 49 rotates (schematically indicated by arrow 110 on FIG. 2), cam followers (pins 54) on the centralizer arms 41 will follow the cam slots 51, extending/retracting the arms 41 and pads 40.

(b) Both the upper and lower centralizers will be operated (pads 40 for upper and lower spacing assemblies 30 and 31) for extension and retraction by a single control lever (located above the surface of the water and not shown for clarity). The upper and lower centralizers extension and/or retraction can be synchronized by utilizing a synchronizing flow divider. This type of valve allows all cylinders 45 to move at the same rate. However, should one centralizer contact and clamp the casing/pipe/caisson/jacket leg 20 before the other centralizer, the non-contacting centralizer is still allowed to extend and clamp the casing/pipe/caisson/jacket leg 20.

(c) A pressure control valve will be used on the extend side of the cylinders 45 to control the maximum force output of the cylinders 45. This will limit the force between the centralizer arms 41/pads 40 and the inside diameter of the casing 20.

2. Dovetail Mill Slides (a) The two dovetail mill slides 81,82 will each be extended and/or retracted by a hydraulic cylinder (shown in FIG. 13 as cylinders 84). Both mill slides 81,82 will be operated by a single control lever (located above the surface of the water and not shown for clarity). A single, adjustable pressure reducing/relieving valve will be used on the extend side of both cylinders 84 (schematically indicated by arrows 83). The mill slides 81,82 may move at different rates or one may extend and contact the casing/pipe/caisson/jacket leg 20 before the other moves, as the hydraulic fluid will take the path of least resistance.

(b) Once contacting the casing/pipe/caisson/jacket leg 20, the mill bits 68 will push against the casing/pipe/caisson/jacket leg 20 with a constant force, limited by the pressure reducing/relieving valve until the rotating mill bits 68 penetrate the casing/pipe/caisson/jacket leg 20. Once the mill bits 68 penetrate, the guide wheels 77 will contact the inside diameter of the casing/pipe/caisson/jacket leg (shown in FIG. 13), with a constant force limited by the pressure reducing/relieving valve. As the bottom ring 63 is rotated in the direction of arrow 44, the guide wheels 77 will follow the inside wall 38' of the casing/pipe/caisson/jacket leg 20' with a constant applied force, regardless of casing/pipe/caisson/jacket leg 20' ovality or concentricity (such extending and retracting movement is schematically indicated by arrows 83 in FIG. 13).

3. Rotating Mill Bits (a) The two hydraulic motors 96 will be controlled from a single lever valve (located above the surface of the water and not shown for clarity). The motors 96 will be connected hydraulically in series, so that both motors 96 turn at the same rate (schematically indicated by arrows 92), regardless of the load applied to the mill bits 68. A pressure relief valve will be used to control the torque output. A flow control valve will be used to control the rotational speed.

4. Rotating Bottom Ring (a) The rotating bottom ring 63 is driven by a single hydraulic motor 66, driving a pinion gear 65 in contact with a ring gear 64. The hydraulic motor 66 will be controlled by a single lever valve (located above the surface of the water and not shown for clarity). Rotational speed will be adjustable by using a flow control valve. A pressure relief valve will limit the rotational torque.

The following is a list of reference numerals which are used in this application along with a description of the reference numeral.

REFERENCE NUMERAL LIST

| Reference Number | Description |
| --- | --- |
| 10 | interval caisson/jacket leg cutter apparatus |
| 11 | lift line |
| 12 | ring |
| 13 | cable/sling |
| 14 | upper frame portion |
| 15 | peripheral beam |
| 16 | diagonal beam |
| 17 | eyelet |
| 18 | wall |
| 19 | interior |
| 20 | caisson/jacket leg |
| 21 | mud line |
| 22 | cut |
| 23 | cut section |
| 24 | rigging |
| 25 | shackle |
| 26 | lift line |
| 27 | arrow |
| 28 | adjustment opening |
| 29 | upper edge |
| 30 | spacing/stabilizing assembly |
| 31 | spacing/stabilizing assembly |
| 32 | cutter assembly |
| 33 | vertical support/leg |
| 34 | disk |
| 35 | inner stop |
| 36 | outer stop |
| 37 | gap |
| 38 | inside surface |
| 39 | spacer/bearing |
| 40 | pad |
| 41 | arm |
| 42 | arrow |
| 43 | bearing assembly |
| 44 | arrow |
| 45 | extensible cylinder |
| 46 | cylinder |
| 47 | pushrod |
| 48 | static plate |
| 49 | rotating plate |
| 50 | hub/rotary connection |
| 51 | curved slot |
| 52 | pinned connection |
| 53 | pinned connection |
| 54 | pin |
| 55 | straight slot |
| 56 | curved slot |
| 57 | stop pin |
| 58 | spacer |
| 59 | arrow |
| 60 | cutter frame |
| 61 | circular plate |
| 62 | radial plate |
| 63 | rotating circular ring |
| 64 | arcuate toothed rack |
| 65 | pinion gear/drive gear |
| 66 | motor drive |
| 67 | non-rotating ring |
| 68 | rotary mill |
| 69 | attachment |
| 70 | rail |
| 71 | arrow |
| 72 | arrow |
| 73 | pinion gear |
| 74 | toothed rack |
| 75 | motor drive |
| 76 | sliding sections |
| 77 | roller |
| 78 | extensible cylinder |
| 79 | extensible cylinder |
| 80 | rail |
| 81 | sliding section |
| 82 | sliding section |
| 83 | arrows |
| 84 | cylinder body |
| 85 | pushrod |
| 86 | phantom lines |
| 90 | arrow |
| 92 | arrow |
| 96 | motor drive |

-continued

| Reference Number | Description |
| --- | --- |
| 100 | arrow |
| 110 | arrow |
| 200 | extension support |
| 202 | extension support |
| 204 | extension support |
| 210 | cylinder |
| 212 | cylinder |
| 214 | cylinder |
| 220 | rod |
| 222 | rod |
| 224 | rod |
| 230 | pivot |
| 231 | pivot |
| 232 | pivot |
| 233 | pivot |
| 234 | pivot |
| 235 | pivot |
| 240 | arm |
| 242 | arm |
| 244 | arm |
| 250 | track |
| 252 | track |
| 254 | track |
| 260 | cover |
| 262 | cover |
| 264 | cover |
| 270 | plurality of vertical spacing supports between upper and lower stabilizing sections |
| 280 | cylinder |
| 282 | rod |
| 283 | pivoting pin |
| 286 | cylinder |
| 288 | rod |
| 289 | pivoting pin |
| 300 | arrows |
| 310 | arrows |
| 350 | upper plate |
| 360 | lower plate |
| 400 | flow diverter |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An internal caisson/jacket leg cutter for cutting a caisson/jacket leg having a leg diameter and a leg upper end comprising:
   a) a frame having upper and lower end portions, a plurality of rigid vertical supports and a central, generally vertical frame axis;
   b) the frame upper end portion having rigging that enables the frame to be lifted;
   c) extensible arms movably supported upon the frame and that extend and retract along generally radial lines, extension of the arms enabling the arms to center the frame inside a caisson/jacket leg, said arms including at least one plurality of said arms that are mounted to said vertical supports and adjustable in elevation relative to said rigid vertical supports;
   d) a plurality of extensible cylinders on the frame that simultaneously extend the arms during centralization of the frame within a caisson/jacket leg;
   e) a cutting mechanism that is attached to said vertical supports at a position below said extensible arms, wherein said cutting mechanism includes circumferentially spaced apart cutters that cut the caisson/jacket leg wall as each cutter travels along an arc shaped path traversing the caisson/jacket leg wall; and
   f) wherein each cutter is a rotary bit having a free outer end and an inner end coupled to and powered by a bit motor drive, each bit being movable between a retracted position that pulls the bit free end toward said central frame axis and an extended position that engages the bit free end with the leg to be cut, wherein the bit rotates about a longitudinal axis that intersects the frame central, generally vertical frame axis.

2. The internal caisson/jacket leg cutter of claim 1, wherein there are a pair of the cutters.

3. The internal caisson/jacket leg cutter of claim 1, wherein each cutter is a rotary bit that rotates about a radially extending line.

4. The internal caisson/jacket leg cutter of claim 1, wherein there is a second motor drive that rotates each cutter along the arc shaped path.

5. The internal caisson/jacket leg cutter of claim 1, wherein each cutter is movable between extended and retracted positions along a common radial line.

6. The internal caisson/jacket leg cutter of claim 1, wherein a plurality of hydraulic cylinders move the cutters between the extended and retracted positions.

7. The internal caisson/jacket leg cutter of claim 1, wherein the extensible arms are mounted in between a pair of plates.

8. The internal caisson/jacket leg cutter of claim 1, wherein the frame includes a top that is configured to rest upon the top of a caisson/jacket leg to be cut.

9. The internal caisson/jacket leg cutter of claim 1 further comprising a roller next to the motor drive and rotary bit that limits the penetration of the rotary bit into the leg to be cut.

10. An internal caisson/jacket leg cutter and an upper end portion with an edge comprising:
    a) a frame having upper and lower end portions, a central, generally vertical frame axis and a plurality of rigid vertical members;
    b) the frame upper end portion having rigging that enables the frame to be lifted, wherein the rigging includes a hanger that is attached to and that extends downwardly from said vertical members;
    c) upper and lower spacing assemblies, each spacing assembly attached to said vertical members and comprising a plurality of circumferentially spaced apart, radially extending arms that are movably supported upon the frame and that each extend and retract along generally radial lines, the spacing assemblies spacing the frame inwardly of a caisson/jacket leg inner surface at upper and lower spaced apart positions, wherein one or both of said spacing assemblies is movable to connect to said vertical members at different elevational positions relative to said vertical members;
    d) each spacing assembly having a plurality of extensible cylinders operatively connected to one of the extensible arms;
    e) the frame supporting a cutting mechanism that includes one or more rotary bit cutters that cut the caisson/jacket leg wall as each cutter travels along an arc shaped path traversing the caisson/jacket leg wall;
    f) wherein the cutting mechanism is positioned below the spacing assemblies; and
    g) wherein each cutter is a rotary bit having a free outer end and an inner end coupled to a bit motor drive, each bit being movable between a retracted position that pulls the bit free end toward said central axis and an extended position that engages the bit free end with the leg to be cut wherein the bit rotates about a longitudinal axis that intersects the central, generally vertical frame axis.

11. The internal caisson/jacket leg cutter of claim 10, wherein each cutter is a rotary mill.

12. The internal caisson/jacket leg cutter of claim 10, wherein each cutter is movable between extended and retracted positions.

13. The internal caisson/jacket leg cutter of claim 10, wherein the extensible arms are mounted in between a pair of plates.

14. The internal caisson/jacket leg cutter of claim 10, wherein each spacing assembly is vertically adjustable relative to the frame.

15. The internal caisson/jacket leg cutter of claim 10, wherein the frame includes multiple vertically extending members.

16. The internal caisson/jacket leg cutter of claim 10 further comprising a roller next to the motor drive and rotary bit that limits the penetration of the rotary bit into the leg to be cut.

17. A method of removing a jacket tubular member having a top with an upper edge from a seabed, comprising the steps of:
  a) lowering a cutter on a frame into the jacket tubular, said frame having a frame weight and a central, generally vertical frame axis;
  b) supporting the frame with a hanger;
  c) extending multiple arms from the frame to engage the tubular at circumferentially spaced apart positions;
  d) extending a powered rotary mill to the tubular, said mill rotating about a longitudinal axis that intersects said generally vertical frame axis;
  e) rotating the mill along an arcuate path so that the mill traverses the tubular to form a cut;
  f) removing a cut section of the tubular above the cut of step "d".

18. The method of claim 17, wherein the cut is below a mudline of the seabed.

19. The method of claim 17, wherein there are multiple mills.

20. The method of claim 17, wherein there are arms extended in step "b" at upper and lower positions.

21. The method of claim 17, wherein the arms are retracted after step "d".

22. The method of claim 17, wherein the mills are movable between extended and retracted positions.

23. The method of claim 17, wherein a roller affixes the depth of cut of the mill.

24. The method of claim 17, wherein the cutter is remotely controlled from a position above the surface of a body of water and the cutter is located below the surface of the body of water.

25. The method of claim 17 further comprising the step of placing the mill below the arms of step "c" before step "e".

* * * * *